(12) United States Patent
Tanaka et al.

(10) Patent No.: US 6,578,095 B1
(45) Date of Patent: Jun. 10, 2003

(54) DATA TRANSFER CONTROL DEVICE FOR TRANSFERRING DATA AMONG A PLURALITY OF NODES AND ELECTRONIC EQUIPMENT

(75) Inventors: Toshiyuki Tanaka, Suwa (JP); Takao Ogawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/425,244

(22) Filed: Oct. 25, 1999

(30) Foreign Application Priority Data

Oct. 27, 1998 (JP) .......................................... 10-321539

(51) Int. Cl.⁷ .................... G06F 13/00; H04L 12/28; H04L 12/56
(52) U.S. Cl. .................... 710/100; 370/256; 370/257; 370/912
(58) Field of Search .................... 710/100; 370/256, 370/257, 912, 462, 465, 408

(56) References Cited

U.S. PATENT DOCUMENTS

| | | | |
|---|---|---|---|
| 5,687,319 A | * 11/1997 | Cook et al. .................. | 370/256 |
| 5,802,057 A | * 9/1998 | Duckwall et al. ........... | 370/408 |
| 6,138,178 A | * 10/2000 | Watanabe ...................... | 710/8 |
| 6,157,650 A | * 12/2000 | Okuyama et al. ........... | 370/401 |
| 6,157,972 A | * 12/2000 | Newman et al. ............ | 370/912 |
| 6,212,171 B1 | * 4/2001 | LaFollette et al. .......... | 370/252 |
| 6,389,496 B1 | * 5/2002 | Matsuda ..................... | 710/316 |
| 6,498,598 B2 | * 12/2002 | Watanabe ................... | 345/156 |

OTHER PUBLICATIONS

"IEEE Standard for a High Performance Serial Bus", IEEE Standard 1394–1995, IEEE Computer Society, 1995, pp. 234 and 326–327.*
*An Outline of the IEEE 1394 High Performance Serial Bus*, Interface, Apr. 1996, pp. 114–123.
*Bus Standards for PC Peripheral Equipment*, Interface, Jan. 1997, pp. 106–116.
*Real–Time Transfer Modes and multimedia–Capable Protocols for IEEE 1394–1995 (Fire Wire)*, Interface, Jan. 1997, pp. 136–146.

* cited by examiner

*Primary Examiner*—David Wiley
*Assistant Examiner*—George Neurauter
(74) *Attorney, Agent, or Firm*—Oliff & Berridge, PLC

(57) ABSTRACT

The objective is to provide a data transfer control device and electronic equipment that are capable of reducing processing overheads, thus enabling high-speed data transfer within a compact hardware configuration. A packet diagnosis circuit diagnoses self-ID packets sent from many nodes, and detects the node that ought to become the isochronous resource manager (IRM) in accordance with IEEE 1394. The ID of that node is held in an IRM ID register. Firmware can discern the ID of the IRM by reading this register. If C and L bits of the self-ID packet of a node are both 1, the ID of that node overwrites the contents of the IRM ID register. Whether or not the system is within a self-ID period is detected and any packet that is sent in within that self-ID period is assumed to be a self-ID packet. When the IRM ID matches the ID of the self-node, information indicating that the self-node is the IRM is stored in a WIRM register, GPID and ESID signals are used together to determine the match between the IRM ID and the self-node ID.

36 Claims, 18 Drawing Sheets

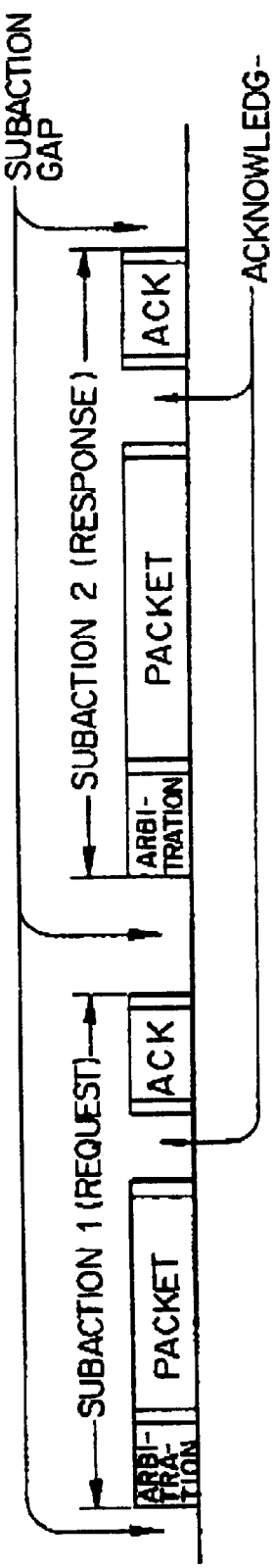
FIG. 1A ASYNCHRONOUS SUBACTION
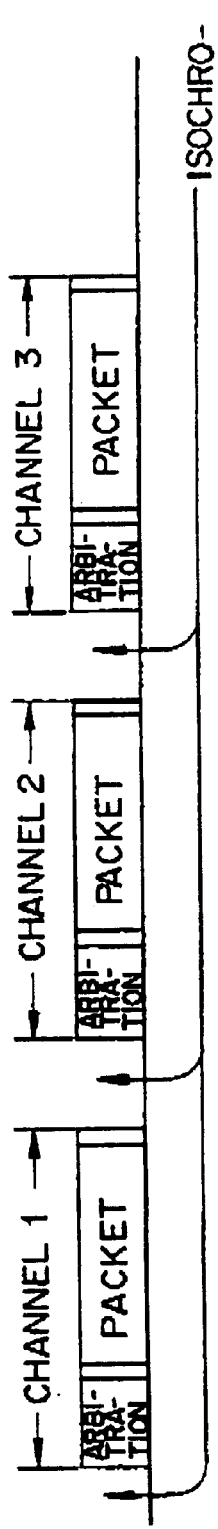
FIG. 1B ISOCHRONOUS SUBACTION
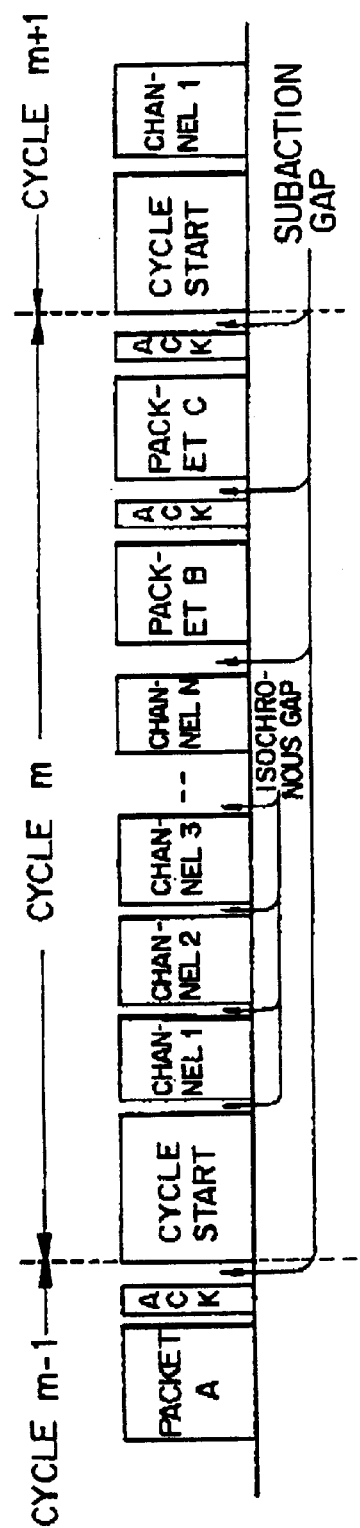
FIG. 1C

FIG. 4A

SELF-ID PACKET #0

| b.31 | | | | | | | | | | | | b.0 |
|---|---|---|---|---|---|---|---|---|---|---|---|---|
| 0 | 10 | PHY_ID | 0 | L | gap_cnt | sp | del | c | pwr | p0 | p1 | p2 | i | m |
| 1 | LOGICAL INVERSE OF FIRST QUADLET ||||||||||||

FIG. 4B

SELF-ID PACKETS #1, #2, #3

| b.31 | | | | | | | | | | | | | b.0 |
|---|---|---|---|---|---|---|---|---|---|---|---|---|---|
| 0 | 10 | PHY_ID | 1 | n | rsv | pa | pb | pc | pd | pe | pf | pg | ph | r | m |
| 1 | LOGICAL INVERSE OF FIRST QUADLET |||||||||||||

FIG. 4C

LINK-ON PACKET

| b.31 | | | | | | | | b.0 |
|---|---|---|---|---|---|---|---|---|
| 0 | 01 | PHY_ID | 0000 | 0000 | 0000 | 0000 | 0000 | 0000 |
| 1 | LOGICAL INVERSE OF FIRST QUADLET ||||||||

FIG. 4D

PHY CONFIGURATION PACKT

| b.31 | | | | | | | | | b.0 |
|---|---|---|---|---|---|---|---|---|---|
| 0 | 00 | PHY_ID | R | T | gap_cnt | 0000 | 0000 | 0000 | 0000 |
| 1 | LOGICAL INVERSE OF FIRST QUADLET |||||||||

CTL WHEN PHY IS DRIVING

| CTL | NAME |
|-----|---------|
| 0 0 | IDLE |
| 0 1 | STATUS |
| 1 0 | RECEIVE |
| 1 1 | GRANT |

STATUS BITS

| BIT | NAME |
|------|------|
| 0 | ARBITRATION RESET GAP |
| 1 | SUBACTION GAP |
| 2 | BUS RESET |
| 3 | PHY INTERRUPT |
| 4 – 7 | ADDRESS |
| 8 – 15 | DATA |

COMPARATIVE EXAMPLE

THIS EMBODIMENT

DATA TRANSFER CONTROL DEVICE FOR TRANSFERRING DATA AMONG A PLURALITY OF NODES AND ELECTRONIC EQUIPMENT

BACKGROUND OF THE INVENTION

1. Field of the Invention

This invention relates to a data transfer control device and electronic equipment comprising the same.

2. Description of Related Art

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-R drives, and hard disk drives, but also to domestic appliances such as video cameras, VTRs, and TVs. This standard is therefore expected to enable a dramatic acceleration of the digitalization of electronic equipment.

The concept of IEEE 1394 is disclosed in various publications, such as "An outline of the IEEE 1394 High Performance Serial Bus" (*Interface*, April 1996, pages 1 to 10), "Bus Standards for PC Peripheral Equipment" (*Interface*, January 1997, pages 106 to 116), and "Real-Time Transfer Modes and Multimedia-Capable Protocols for IEEE 1394-1995 (FireWire)" (*Interface*, January 1997, pages 136 to 146). Texas Instruments' TSB12LV31 is known as a data transfer control device that conforms to IEEE 1394.

However, some technical problems have been identified with such a data transfer control device conforming to IEEE 1394, as described below.

That is to say, the current IEEE 1394 standard does make it possible to implement transfer speeds up to a maximum of 400 Mbps. In practice, however, the presence of processing overheads forces the actual transfer speeds of an entire system to be much slower. In other words, the firmware and application software running on a CPU require large amounts of time for processes such as preparing for transmitting data and reading in received data, which means it is not possible to implement high-speed data transfer overall, no matter how fast the data can be transferred over the IEEE 1394 bus.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

SUMMARY OF THE INVENTION

This invention was devised in the light of the above described technical problem, and has as an objective thereof the provision of a data transfer control device and electronic equipment using the same which are capable of reducing the processing overheads of firmware and application software, thus implementing high-speed data transfer within a compact hardware.

In order to solve the above described technical problem, there is provided a data transfer control device for transferring data among a plurality of nodes that are connected to a bus, according to a first aspect of the present invention. This data transfer control device comprises: a circuit for diagnosing a self identification packet and for automatically detecting a node that is qualified to become a manager having a given management function based on the results of the diagnosis, when the self identification packet containing basic information on each node is transferred from each node; and first holding means for acquiring the identification number of a detected node from basic information in the self identification packet sent by that node, and for holding that identification number.

This aspect of the invention ensures that the identification number of the node that is qualified to become the given manager is detected automatically by the hardware, and this identification number is held in the first holding means configuration of a register or semiconductor memory, by way of example. This arrangement makes it possible to reduce the processing load on the firmware or the like that is controlling data transfer. This also makes it possible to expect improvements in actual transfer speeds and reductions in the costs of devices.

An identification number of a node may be overwritten onto an identification number previously held in the first holding means, when it is determined from basic information in the self identification packet sent by the node that the node is qualified to become the manager having the management function, on condition that self identification packets are sent in sequence starting from nodes furthermost from a root node within node connection topology. This arrangement makes it possible to detect the node that is qualified to become the manager in a simpler manner, by skillfully utilizing a sequence in which the self identification packets are sent in.

The data transfer control device may further comprise a circuit for detecting whether or not the system is within a self identification period, based on status information sent in from a lower layer; and a packet that arrives within the self identification period may be assumed to be a self identification packet, and a node that is qualified to become the manager may be automatically detected based on that self identification packet. This configuration makes it possible to detect whether or not a packet that is to be processed is a self identification packet, in a simple manner, which makes the hardware more compact.

The data transfer control device may further comprise second holding means for holding information indicating that the self-node is the manager having the management function, when the identification number of a node that is qualified to become the manager matches the identification number of the self-node. This arrangement makes it possible to know whether or not the self-node is the manager having the management function, in a simple manner.

In this data transfer control device, a judgement may be made as to whether or not the identification number of a node that is qualified to become the manager matches the identification number of the self-node, using both a first signal that becomes active on condition that the identification number of the self-node has become definite and a second signal that becomes active on condition that a self identification period has ended. Use of the first signal ensures that correct action is taken even if the identification number of the self-node becomes definite after the self identification period has ended. Use of the second signal ensures that correct action is taken even if the node that is qualified to become the manager is changed after the identification number of the self-node has become definite.

In this data transfer control device, a judgement may be made as to whether or not the identification number of a node that is qualified to become the manager matches the identification number of the self-node, using a third signal that becomes active on condition of the detection of a subaction gap. This arrangement makes it possible to correctly detect a match between the identification number of a node that is qualified to become the manager and the identification number of the self-node, with a simple circuit configuration when the setup incorporates physical-layer devices wherein the identification number of the self-node always becomes definite within the self identification period.

This data transfer control device may further comprise means for reading out from the first holding means the identification number of a node that is qualified to become the manager and for controlling data transfer by use of the read-out identification number. Firmware running on a central processing unit can be considered as an example of this data transfer control means.

Note that the manager having the management function in accordance with this invention is preferably an isochronous resource manager conforming to the IEEE 1394 standard.

According to a second aspect of the present invention, there is provided electronic equipment comprising: any one of the above described data transfer control devices; a device for performing given processing on data that has been received from another node via the data transfer control device and the bus; and a device for outputting a storing data that has been subjected to the processing. According to a third aspect of the present invention, there is provided electronic equipment comprising: any one of the above described data transfer control devices; a device for performing given processing on data that is to be sent to another node via the data transfer control device and the bus; and a device for taking in data to be subjected to the processing.

These aspects of the invention make it possible to increase the speed of processing in the electronic equipment for outputting or storing data that has been transferred from another node, or processing in the electronic equipment for transferring data that has been taken in to another node. These aspects of the invention reduce the processing load on firmware or the like that controls data transfer, thus making it possible to reduce the costs and size of the electronic equipment.

BRIEF DESCRIPTION OF THE DRAWINGS

FIGS. 1A, 1B, and 1C are illustrative of the concepts of asynchronous transfer and isochronous transfer;

FIGS. 4A, 4B, 4C, and 4D show the formats of various physical-layer packets such as a self-ID packet;

DETAILED DESCRIPTION OF THE PREFERRED EMBODIMENT

Figure 2A:
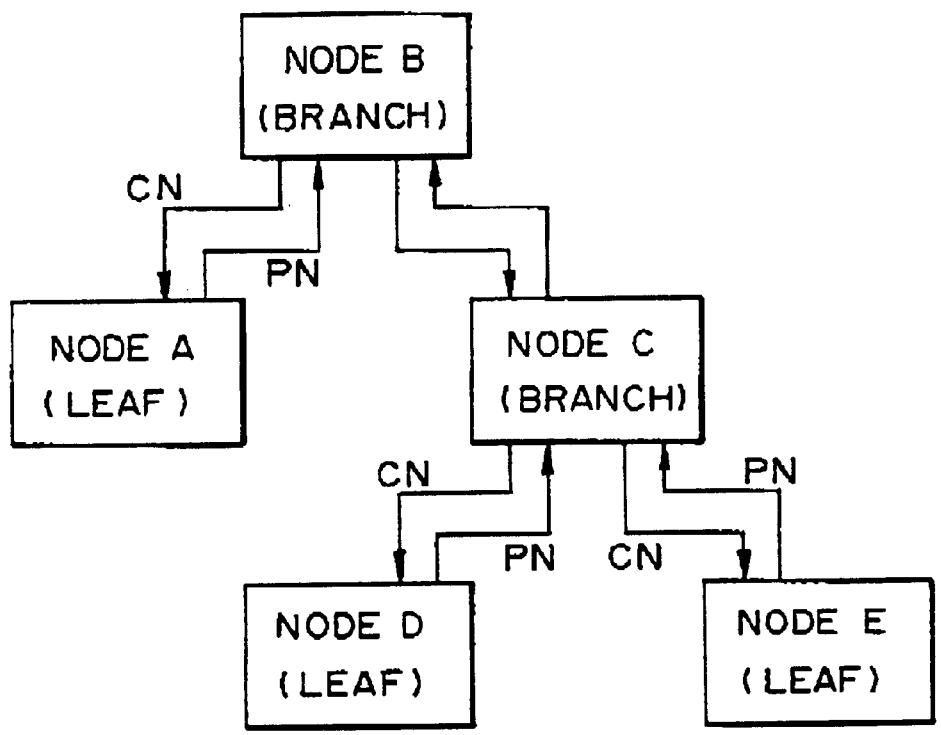
FIGS. 2A and 2B are illustrative of the concept of tree identification.

A preferred embodiment of this invention is described below with reference to the accompanying drawings.
1. IEEE 1394

The description first relates to an outline of IEEE 1394.
1.1 Data Transfer Speed and Connection Topology The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

A bus reset occurs if power is applied, or if devices have been disconnected or connected in the interim, and all information relating to connection topology is cleared thereby. After the bus reset, tree identification (determination of the root node) and self identification are performed. Subsequently, management nodes such as the isochronous resource manager, cycle master, and bus manager are determined. Ordinary packet transfer then starts.
1.2 Transfer Methods IEEE 1394 provides for asynchronous transfer (suitable for data transfers where reliability is required) and isochronous transfer (suitable for transfers of data such as moving images and audio, where real-time capabilities are required), as packet transfer methods.

An example of an asynchronous subaction is shown in FIG. 1A. One subaction consists of arbitration, packet transfer, and acknowledgment. In other words, data transfer has precedence but first of all arbitration relating to the right of use of the bus takes place. A packet is then transferred from the source node (the originator of the transfer) to the destination node (the destination of the transfer). A source ID and a destination ID are comprised within the header of this packet. The destination node reads this destination ID and determines whether or not the packet is addressed to itself. If the destination node accepts the packet, it sends an acknowledgment (ACK) packet back to the source node.

There is an acknowledgment gap between the packet transfer and the ACK packet. There is also a subaction gap between one subaction and the next subaction. Arbitration for the next subaction cannot occur if a fixed bus idle time equivalent to this subaction gap has not elapsed. This prevents collisions between subactions.

An example of an isochronous subaction is shown in FIG. 1B. Since an isochronous transfer is performed as a broadcast (transfer to all nodes connected to the bus), no ACK is sent back when a packet is received. With isochronous transfer, packet transfer is performed by using channel numbers, not node IDs. Note that there is an isochronous gap between subactions.

The state of the bus during data transfer are shown in FIG. 1C. Isochronous transfer starts whenever the cycle master generates a cycle start packet at fixed intervals. This enables the transfer of at least one packet every 125 µs, for one channel. This makes it possible to transfer data that requires real-time capabilities, such as moving images or audio.

Asynchronous transfer occurs in intervals between isochronous transfers. In other words, isochronous transfer has a higher priority than asynchronous transfer. This is implemented by making the length of an isochronous gap shorter than the length of a subaction gap during asynchronous transfer, as shown in FIG. 1C.

1.3 Tree Identification

Tree identification is performed after a bus reset. During this tree identification, the parent-child relationships between nodes and the root node are determined.

First of all, each leaf node (a node that is connected to only one other node) sends a "parent-notify" (PN) to the adjacent node. If nodes A, B, C, D, and E are connected as shown in FIG. 2A, by way of example, parent-notify is sent from node A to node B and from nodes D and E to node C.

A node that has accepted a parent-notify recognizes that the originating node is its own child. It then sends a "child-notify" (CN) to that node. In the example shown in FIG. 2A, a child-notify is sent from node B to node A and from node C to nodes D and E. This determines the parent-child relationships between nodes B and A, nodes C and D, and nodes C and E.

Figure 2B:
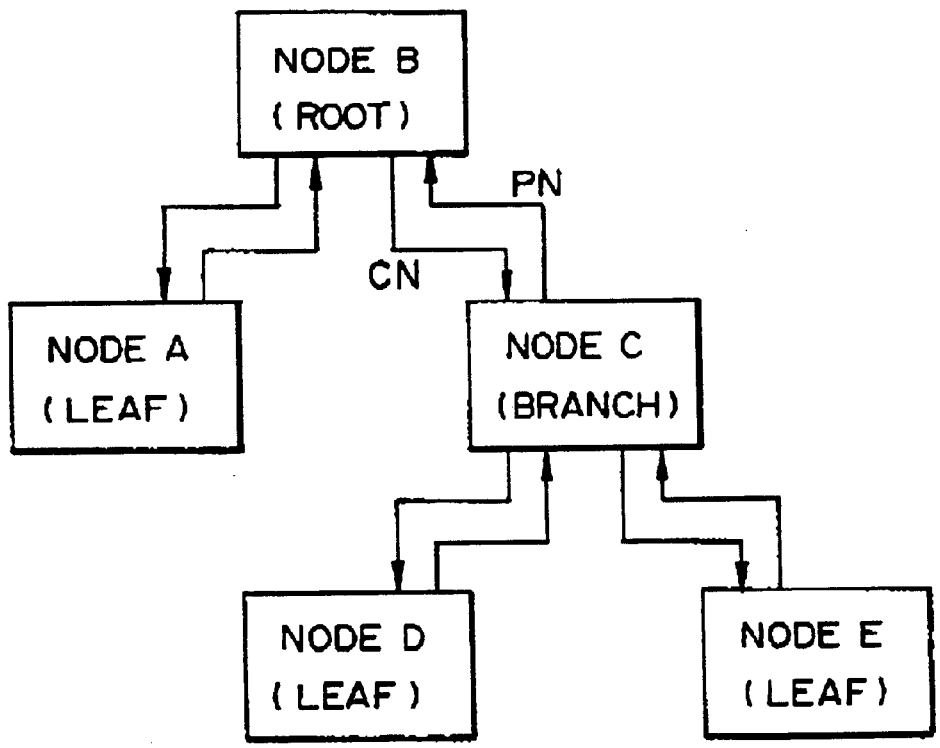

The parent-child relationship between nodes B and C is determined by which of them sends a parent-notify first. If, for example, node C sends the parent-notify first, node B becomes the parent and node C the child, as shown in FIG. 2B.

A node wherein all nodes connected to the ports thereof are own-children becomes the root. In FIG. 2B, node B has become the root. Note that IEEE 1394 allows for the possibility of any node becoming the root.

1.4 Self Identification

After tree identification, self identification occurs. During self identification, self-ID packets are transferred in sequence starting from the nodes furthermost from the root node within the connection topology.

Figure 3:
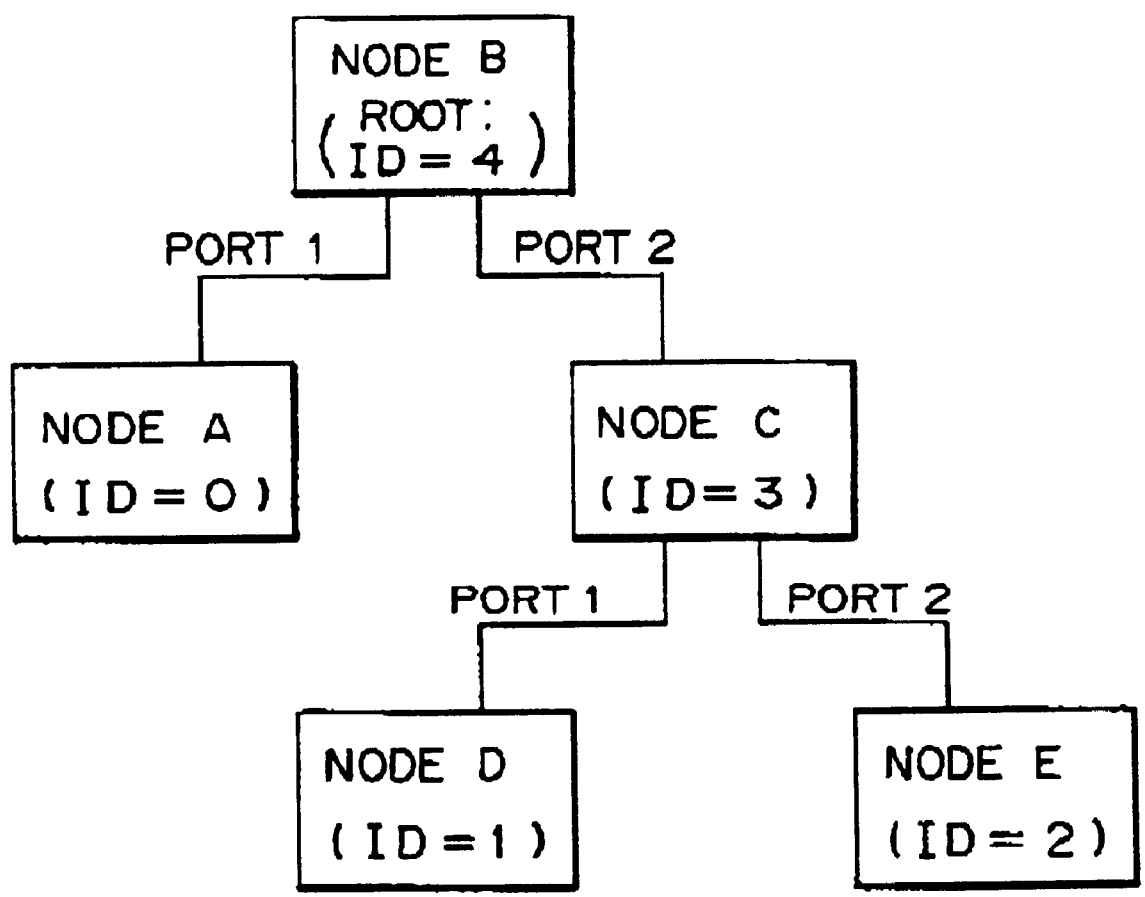
FIG. 3 is illustrative of the concept of self identification.

More specifically, node A, which is connected to port 1 (the port with the smaller number) of the root node B in the configuration shown by way of example in FIG. 3, first broadcasts a self-ID packet (self identification packet) to all the nodes.

Node C, which is connected to port 2 (the port with the larger number) of the root node B, is then selected and node D, which is connected to port 1 (the port with the smaller number) of node C, broadcasts a self-ID packet. Node E, which is connected to port 2 (the port with the larger number) of node C, then broadcasts a self-ID packet, followed by node C. Finally, node B, which is the root, broadcasts a self-ID packet and self identification is complete.

The ID of each node is comprised within each self-ID packet. The ID of a node is the total number of self-ID packets it has received from other nodes up to the point at which that node broadcasts a self-ID packet. Taking the example shown in FIG. 3, no node has yet broadcast a self-ID packet at the point at which node A broadcasts, so the ID of node A becomes 0. Node A broadcasts a self-ID packet containing the ID of 0. When node D broadcasts, only node A has issued a self-ID packet. Therefore, the ID of node D becomes 1. In a similar manner, the IDs of nodes E, C, and B becomes 2, 3, and 4, respectively.

The format of a self-ID packet is shown in FIG. 4A. As shown in this figure, basic information on the nodes is comprised within the self-ID packets. More specifically, information such as the ID of each node (PHY_ID), whether or not the link layer is active (L), the gap-count (gap_cnt), the transfer speed (sp), whether or not the node has the capability of becoming an isochronous resource manager (C), the power state (pwr), and the port states (p0, p1, p2) is comprised therein.

Note that FIG. 4B shows the format of self-ID packets #1, 190 2, and #3 that are used when a node has 4 or more ports. If a node has between 4 and 11 ports, self-ID packets #0 (FIG. 4A) and #1 are used; if a node has between 12 and 19 ports, self-ID packets #0, #1, and #2 are used; and if a node has between 20 and 27 ports, self-ID packets #0, #1, #2, and #3 are used.

The formats of a link-on packet and a PHY configuration packet, which are physical-layer packets, are shown in FIGS. 4C and 4D, in a similar manner to the self-ID packets.

1.5 Isochronous Resource Manager

The isochronous resource manager (IRM) has the management functions described below.

First of all, it provides the various resources necessary for isochronous transfer. For example, it provides a channel number register and a bandwidth register. Secondly, it provides a register that indicates the ID of the bus manager. Thirdly, it assumes some bus management function if there is no other bus manager.

Of the nodes which have the capability of becoming the IRM (which are capable of managing isochronous resources) and which are also in an operational state (having an active link layer), i.e., of the nodes qualified to become the IRM, the node closest to the root (the node with the largest ID) becomes the IRM. More specifically, of the nodes having self-ID packets (see FIG. 4A) wherein the C (CONTENDER) bit indicating whether or not that node has IRM capability and the L (LINK_ACTIVE) bit indicating whether or not the link layer is active are both 1, the closest node to the root (the node with the largest PHY_ID) becomes the IRM. If the C bit and L bit of the self-ID packet of the root node are both 1, for example, the root node will become the IRM.

1.6 Cycle Master and Bus Manager

The cycle master has the role of issuing the cycle start packet shown in FIG. 1C, and the root node becomes the cycle master.

The bus manager performs tasks such as creating a topology map (the connection states of all the nodes), creating a speed map, managing power to the bus, determining the cycle master, and optimizing the gap count.

1.7 Protocol Configuration

Figure 5:
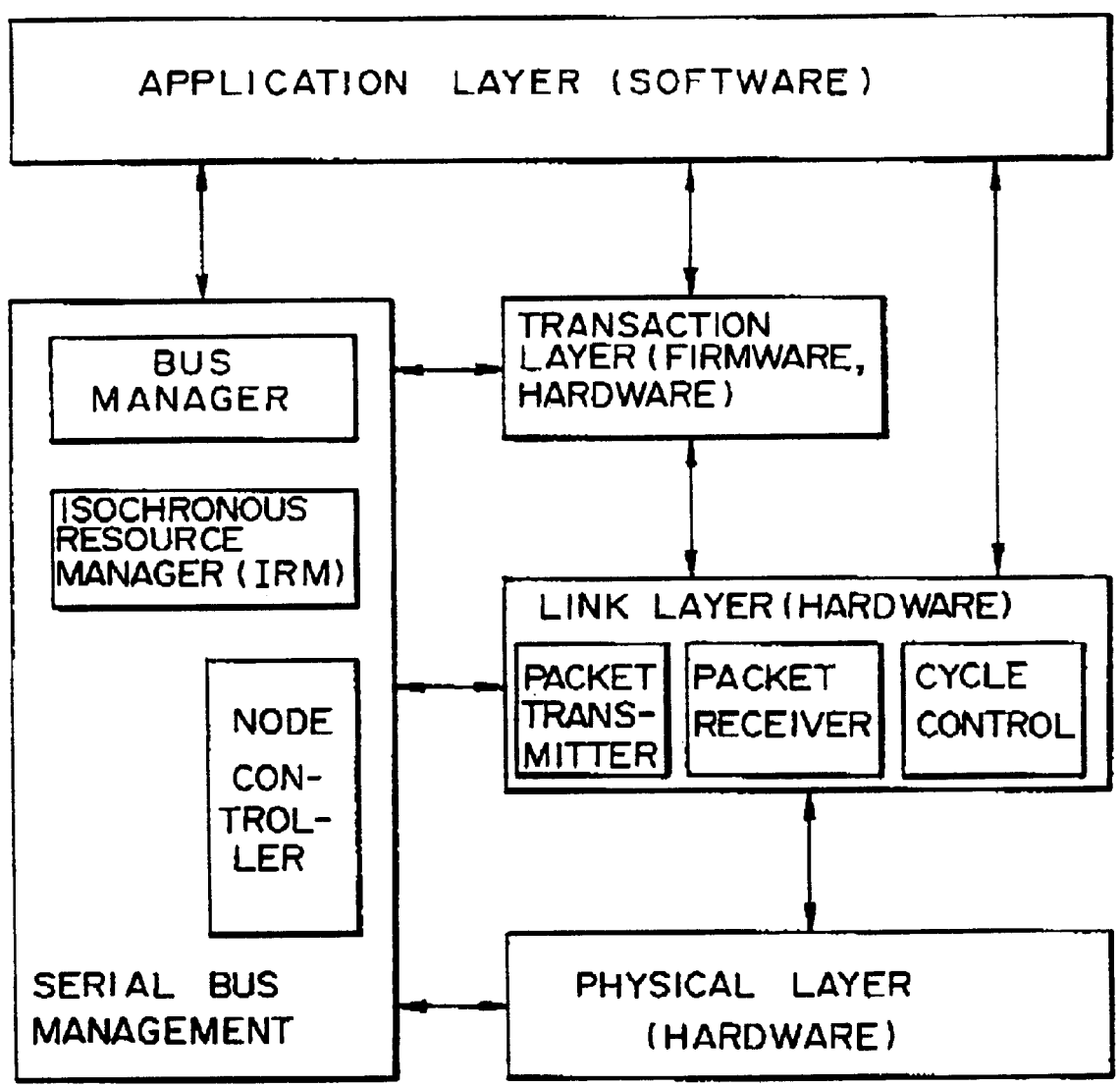
FIG. 5 is illustrative of the IEEE 1394 protocol configuration.

The description now turns to the protocol configuration (layer structure) of IEEE 1394, with reference to FIG. 5.

The IEEE 1394 protocol is configured of a physical layer, a link layer, and a transaction layer. The serial bus management function monitors and controls the physical layer, link layer, and transaction layer, and provides various functions for controlling nodes and managing bus resources.

The physical layer converts the logical symbols used by the link layer into electrical signals, performs bus arbitration, and defines the physical bus interface.

The link layer provides functions such as addressing, data check, data framing, and cycle control.

The transaction layer defines the protocol for transactions such as read, write, and lock.

The physical layer and link layer are usually implemented by hardware such as a data transfer control device (interface chip). The transaction layer is implemented either by firmware operating on the CPU, or hardware.

2. Overall Configuration

The overall configuration of this embodiment is described below, with reference to FIG. 6.

Figure 6:
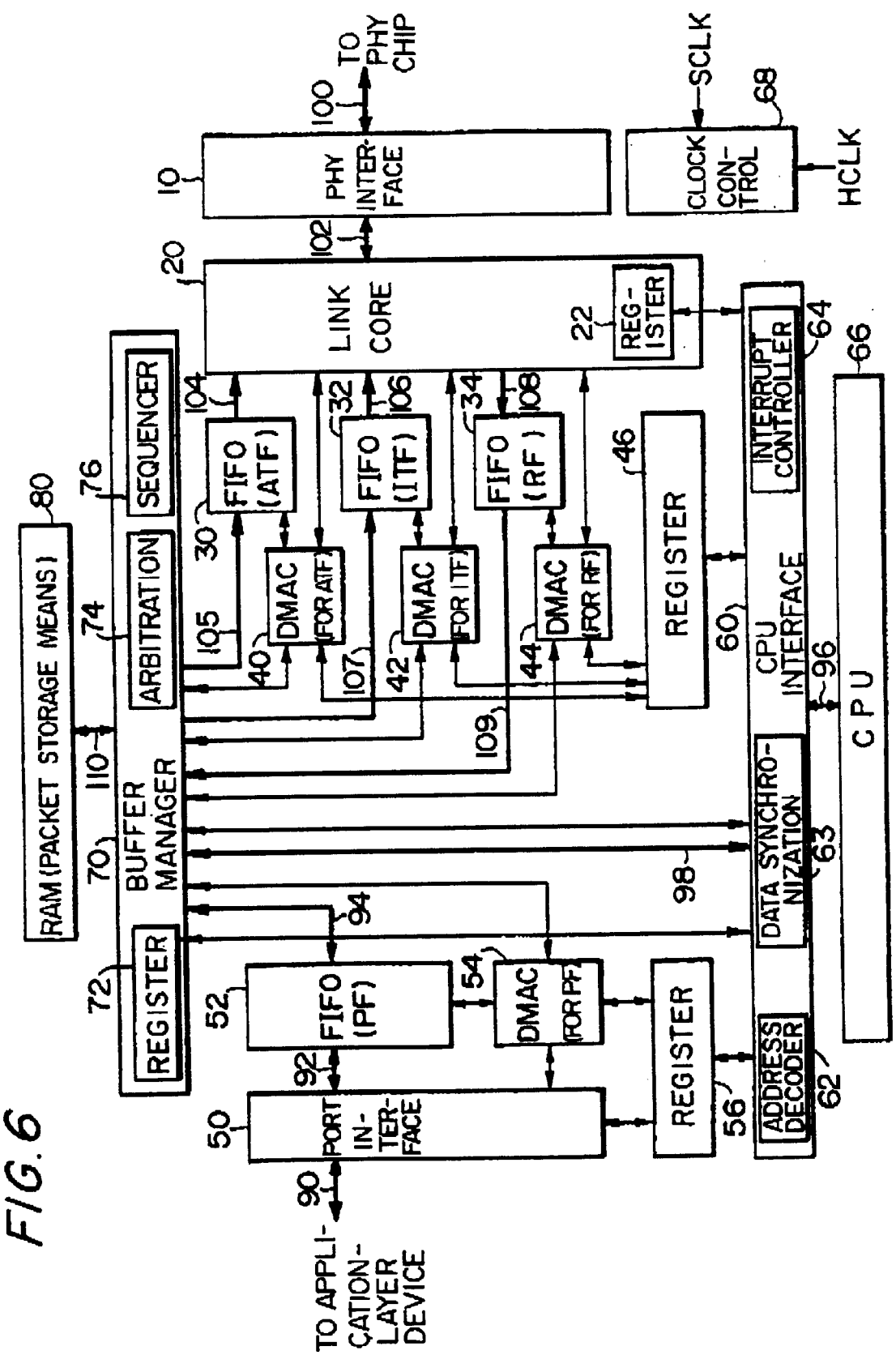
FIG. 6 shows a structural example of the data transfer control device of an embodiment of this invention.

In FIG. 6, a PHY interface 10 is a circuit that provides an interface with a PHY chip that implements the physical-layer protocol.

A link core 20 is a circuit that implements part of the link layer protocol and the transaction layer protocol. A register 22 is provided to control the link core 20 that implements these protocols.

A FIFO (ATF) 30, FIFO (ITF) 32, and FIFO (RF) 34 are FIFO buffers for asynchronous transmission, isochronous transmission, and reception, respectively, each configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

DMACs 40, 42, and 44 are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as devices for print processing, by way of example). In this embodiment of the invention, the use of this port interface 50 makes it possible to transfer 8-bit data transfer, for example.

A FIFO (PF) 52 is a FIFO buffer used for transferring data between an application-layer device and a DMAC 54 is a DMA controller for PF. A register 56 provides control over the port interface 50 and the DMAC 54.

A CPU interface 60 is a circuit that provides an interface with the CPU 66 that controls the data transfer control device. The CPU interface 60 comprises an address decoder 62, a data synchronization circuit 63, and an interrupt controller 64. A clock control circuit 68 is designed to control the clock signals used by this embodiment, and an SCLK signal sent from the PHY chip and an HCLK that is a master clock is input thereto.

A buffer manager 70 is a circuit for managing the interface with the RAM 80. The buffer manager 70 comprises a register 72 for controlling the buffer manager, an arbitration circuit 74 that arbitrates the bus connection to the RAM 80, and a sequencer 76 that generates various control signals.

Figure 7:
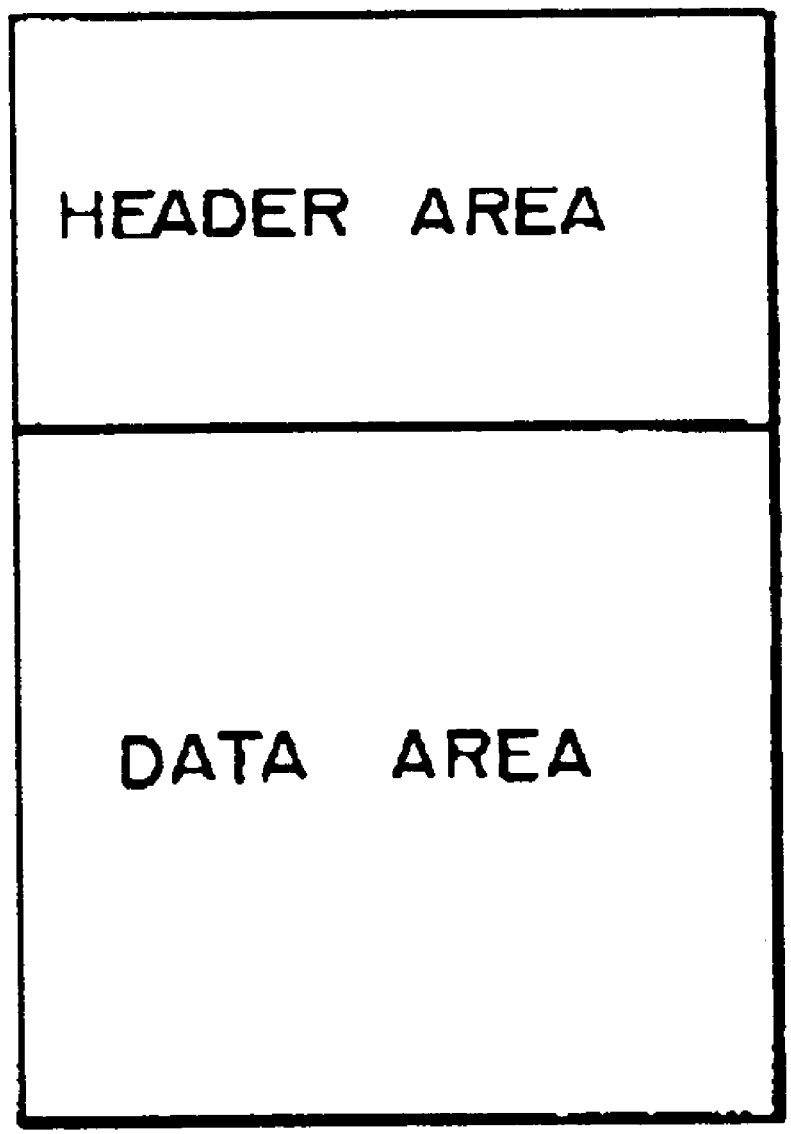
FIG. 7 is illustrative of the separation between the header (control information) area and the data area.

The RAM 80 is designed to function as a randomly accessible packet storage means, where this function is implemented by SRAM or DRAM or the like. In this embodiment of the invention, the RAM 80 is divided into a header area (broadly speaking, a control information area) and a data area, as shown in FIG. 7. The header of a packet (broadly speaking, its control information) is stored in the header area of FIG. 7, and the data of the packet is stored in the data area thereof.

Note that it is particularly preferable that the RAM 80 is accommodated within the data transfer control device of this embodiment, but it is possible to attach either part or all of the RAM 80 externally.

A bus 90 (or buses 92 and 94) is for connections to applications, as a first bus. Another bus 96 (or bus 98) is for controlling the data transfer control device, as a second bus, and is connected electrically to a device (such as a CPU) that controls the data transfer control device. Yet another bus 100 (or buses 102, 104, 105, 106, 107, 108, and 109) is for electrical connections to physical-layer devices (such as the PHY chip), as a third bus. A further bus 110 (a fourth bus) is for electrical connections to RAM that acts as a randomly accessible storage means.

The arbitration circuit 74 in the buffer manager 70 arbitrates bus access requests from the DMAC 40, the DMAC 42, the DMAC 44, the CPU interface 60, and the DMAC 54. Based on the results of this arbitration, a data path is established between one of the buses 105, 107, 109, 98, and 94 and the bus 110 of the RAM 80 (i.e., a data path is established between one of the first, second, and third buses and the fourth bus).

One feature of this embodiment is the way in which it is provided with the RAM 80, which stored packets in a randomly accessible manner, and also the mutually independent buses 90, 96, and 100 as well as the arbitration circuit 74 for connecting one of those buses to the bus 110 of the RAM 80.

Figure 8:
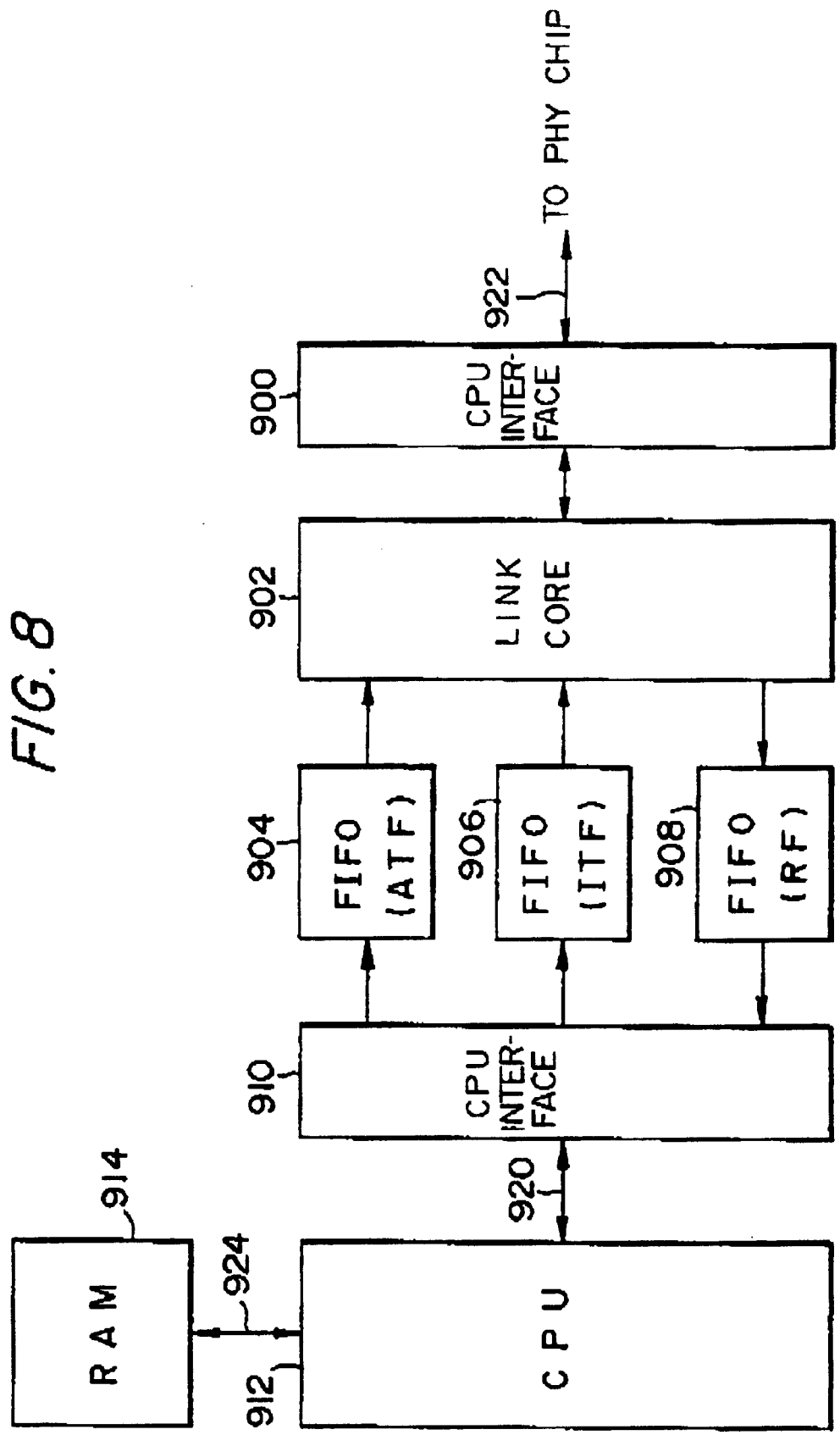
FIG. 8 shows the structure of a comparative example for this embodiment.

A data transfer control device that has a different configuration from that of this embodiment is shown in FIG. 8, by way of example. In this data transfer control device, a link core 902 is connected to a PHY chip by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory of the CPU, by a bus 924.

Note that the FIFOs 904, 906, and 908 differ from the FIFOs 30, 32, and 34 of FIG. 6 in that they each have an extremely large number of stages (such as 16 stages per FIFO).

Figure 9:
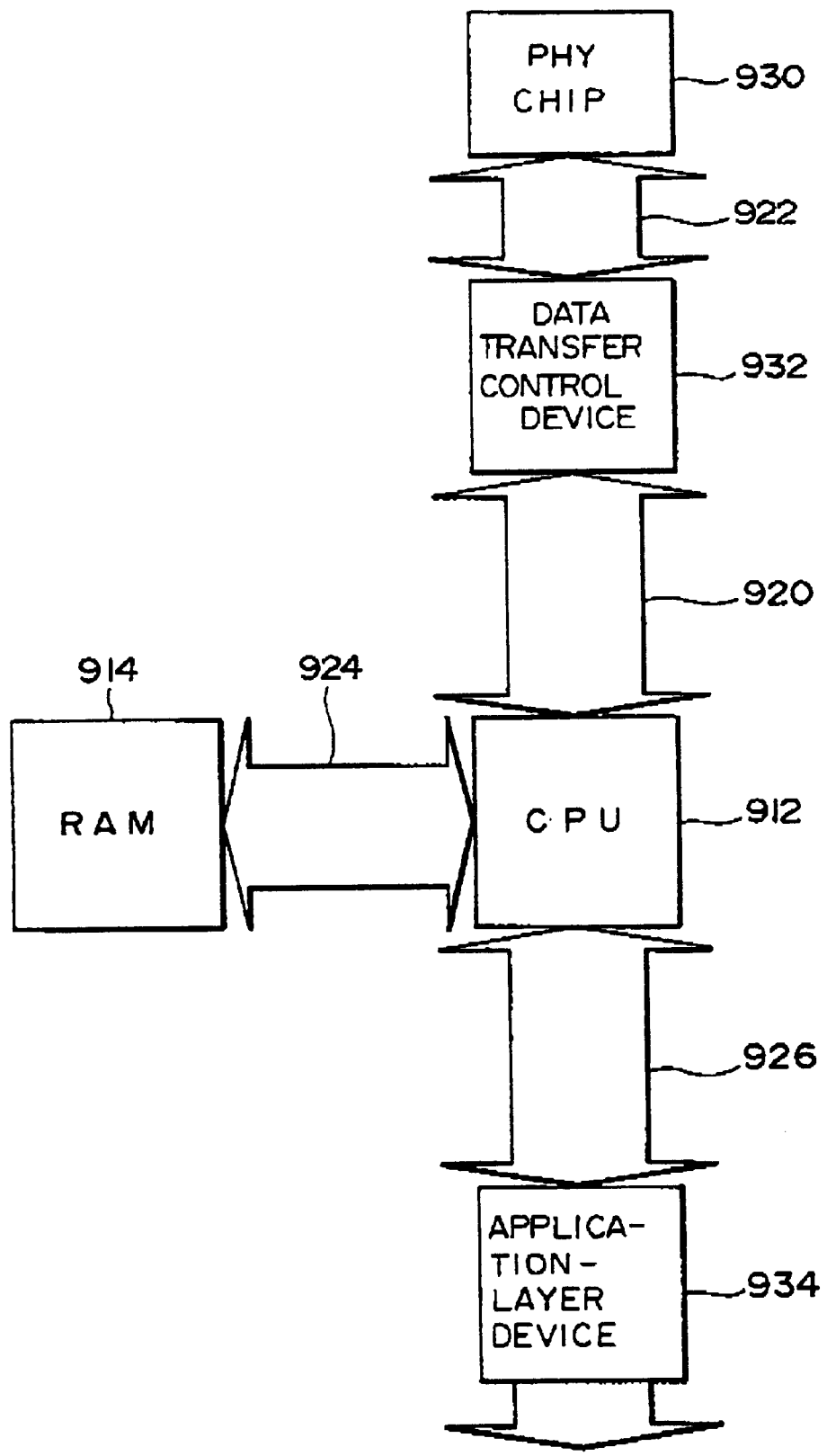
FIG. 9 is illustrative of the method of data transfer used by the configuration of FIG. 8.

The method of data transfer used with the data transfer control device configured as shown in FIG. 8 will now be described with reference to FIG. 9. A receive packet sent from another node via a PHY chip 930 passes through the bus 922, a data transfer control device 932, and the bus 920, then is accepted by the CPU 912. The CPU 912 writes the accepted receive packet to the RAM 914 via the bus 924. The CPU 912 processes the receive packet into a form that can be used by the application layer, then transfers it to an application-layer device 934 via a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node through the path comprising the data transfer control device 932 and the PHY chip 930.

However, if this data transfer method is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 10:
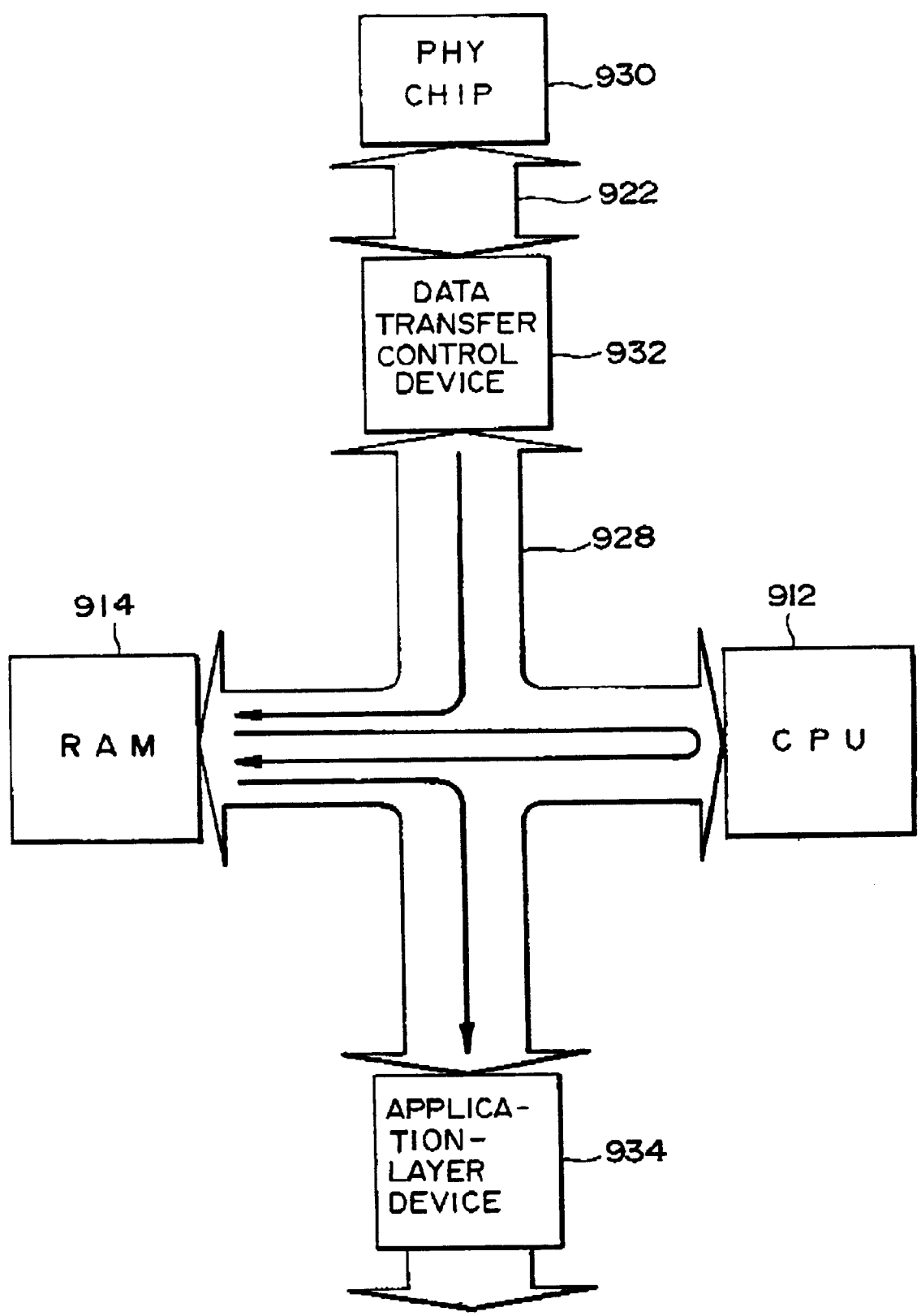
FIG. 10 is illustrative of another method of data transfer.

One method that can be considered for solving this problem uses hardware DMA to implement data transfer between the data transfer control device 932 and the RAM 914 and data transfer between the RAM 914 and the application-layer device 934, as shown in FIG. 10.

With this method, however, a CPU bus 928 has to be used for data transfers between the data transfer control device 932 and the RAM 914, between the RAM 914 and the CPU 912, and between the RAM 914 and the application-layer device 934. This means that if an attempt is made to increase the speed of data transfers within the entire system, a high-speed bus such as a PCI bus must be used as the CPU bus 928, leading to an increase in the cost of electronic equipment that uses this data transfer control device.

Figure 11:
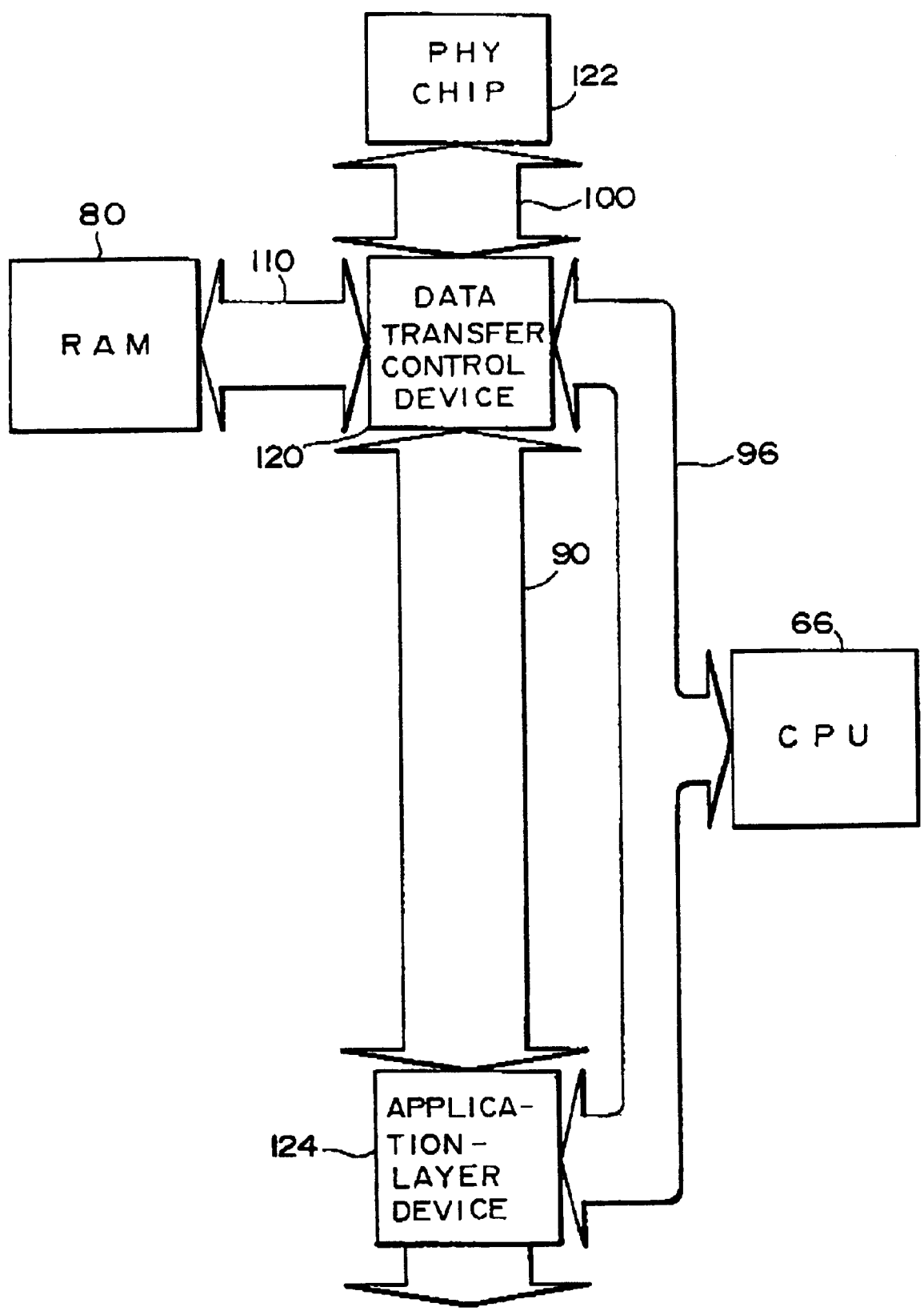
FIG. 11 is illustrative of the method of data transfer used by this embodiment of the invention.

In contrast thereto, this embodiment of the invention ensures that the bus 90 between a data transfer control device 120 and an application-layer device 124, the CPU bus 96, and the bus 110 between the data transfer control device 120 and the RAM 80 are mutually separated, as shown in FIG. 11. The configuration is therefore such that the CPU bus 96 can be used solely for controlling data transfer. In addition, the bus 90 is dedicated so that is can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be designed to be less expensive and more compact.

3. Automatic IRM Detection

The data transfer control device of this embodiment has an automatic IRM detection function. This function is implemented by the link core 20 as shown in FIG. 6.

Figure 12:
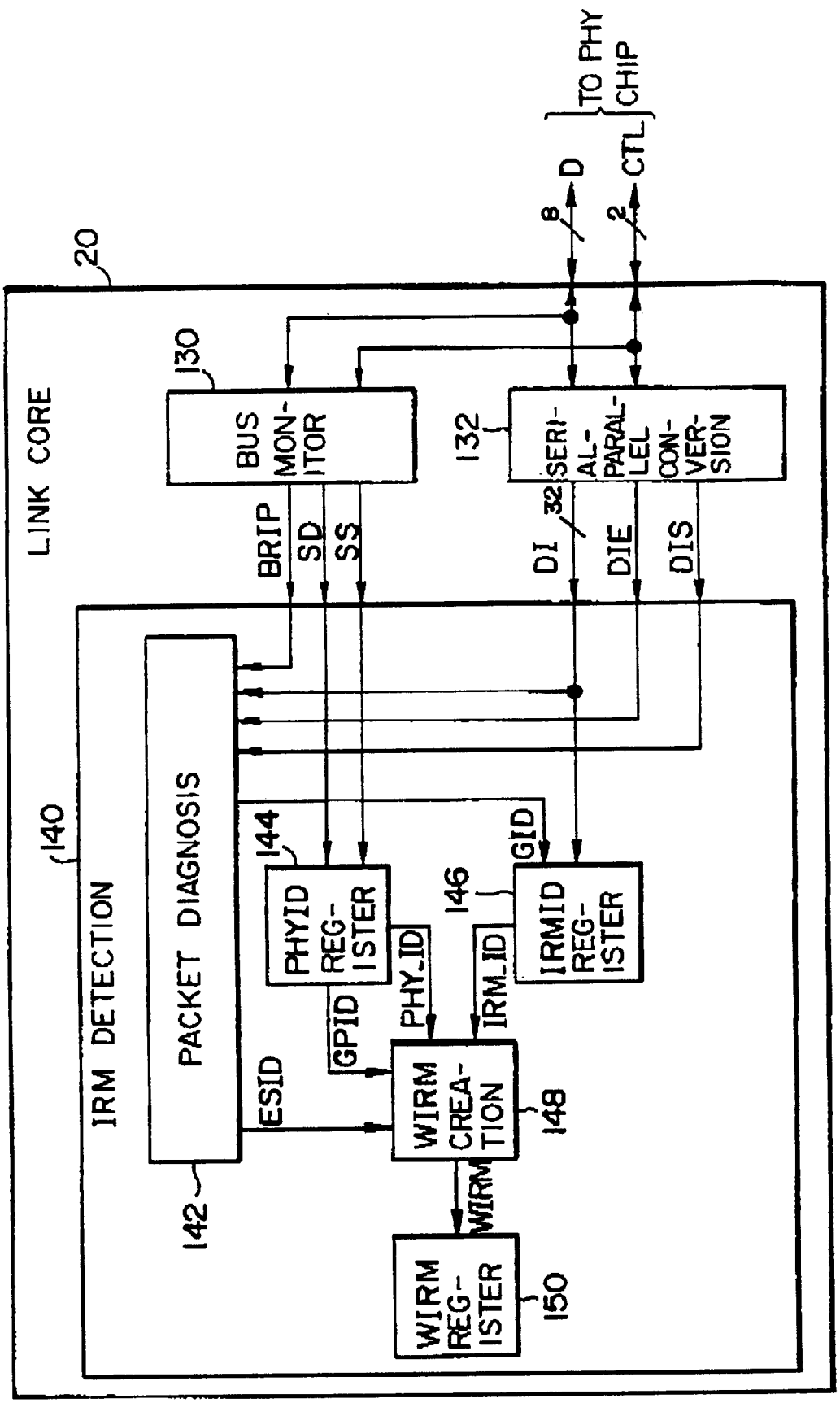
FIG. 12 shows a structural example of the link core (IRM detection circuit)

An example of the configuration of this link core 20 is shown in FIG. 12. Note that the circuit blocks that are not related to the automatic IRM detection are omitted from FIG. 12.

The link core 20 comprises a bus monitor circuit 130, a serial-parallel conversion circuit 132, and an IRM detection circuit 140. The IRM detection circuit 140 comprises a packet diagnosis circuit 142, a PHY ID register 144, an IRM ID register 146, a WIRM creation circuit 148, and a WIRM register 150.

The bus monitor circuit 130 monitors the 8-bit data bus D and the 2-bit control bus CTL that are connected to the PHY chip by the PHY interface 10.

The serial-parallel conversion circuit 132 converts the data on the data bus D into 32-bit data. For example, if the transfer speed is 400 Mbps, 8-bit data is converted into 32-bit data; if the transfer speed is 200 Mbps, 4-bit data is converted into 32-bit data; and if the transfer speed is 100 Mbps, 2-bit data is converted into 32-bit data.

The packet diagnosis circuit 142 diagnosis packets such as self-ID packets.

The PHY ID register 144 is designed to hold the ID (PHY_ID) of the self-node. The IRM ID register 146 is a register in which the IDs (IRM-ID) of nodes that are qualified to become the IRM are sequentially overwritten. Note that the ID of the node that eventually becomes the IRM is held in the IRM ID register 146.

The WIRM creation circuit 148 detects whether or not the PHY_ID and IRM_ID match and, if they do match, creates a WIRM (WonIRM) signal that is information indicating that this node has become the IRM. This WIRM is held in the WIRM register 150.

Figure 13:
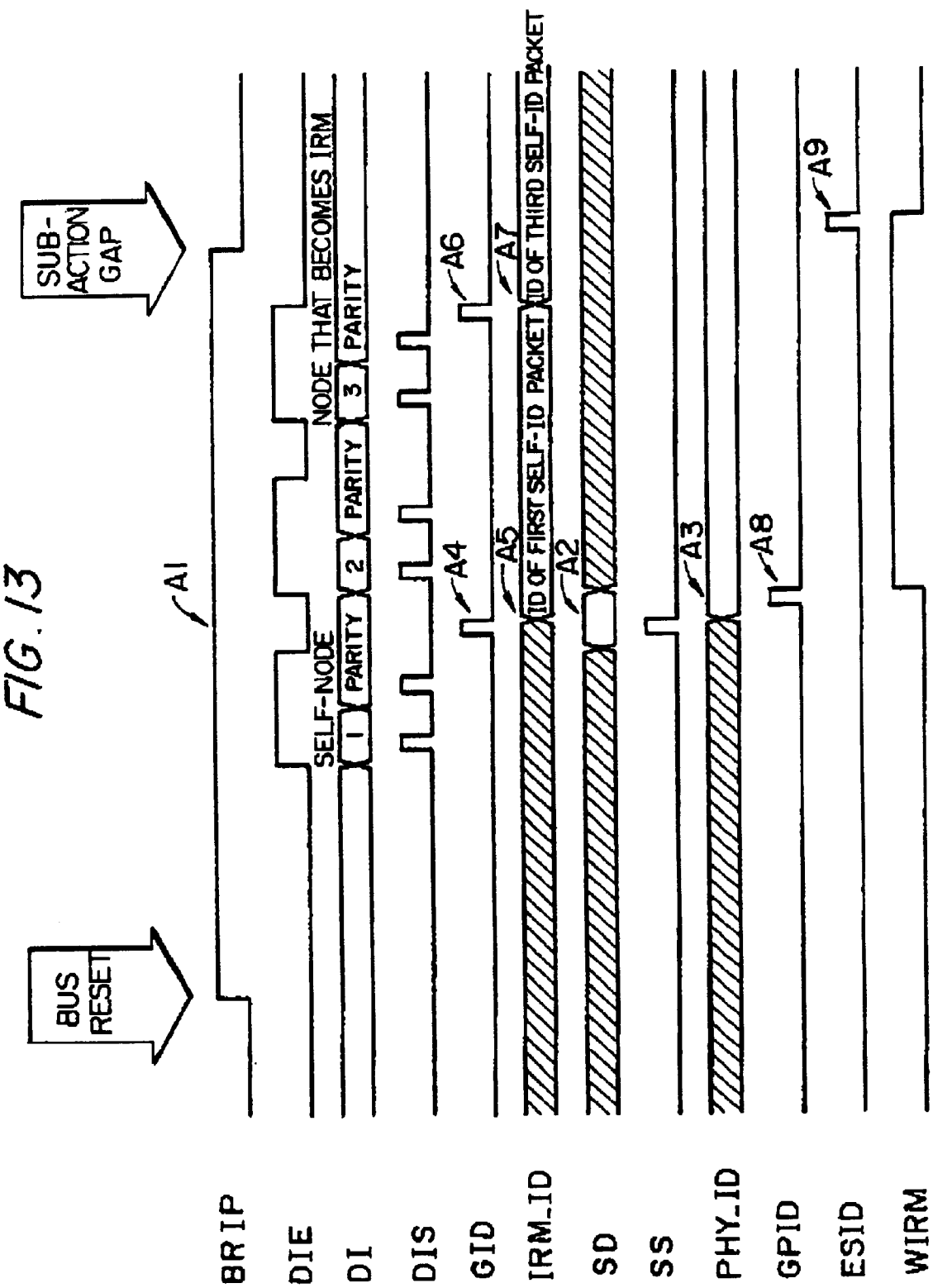
FIG. 13 is a timing waveform chart illustrating a detailed processing example of IRM detection.

The description now turns to details of the automatic IRM detection processing, with reference to the timing waveform chart of FIG. 13. There are three nodes in FIG. 13, illustrating an example wherein the first node to send a self-ID packet is the self-node (present node) and the third node to send a self-ID packet becomes the IRM.

first of all, the bus monitor circuit 130 determines whether or not the system is in a self-ID period (the period from a bus reset up to the first subaction gap) and, if it is in this self-ID period, it makes a signal BRIP go high to indicate that the bus reset is occurring, as shown by A1 in FIG. 13.

Figures 14A, 14B, 14C:
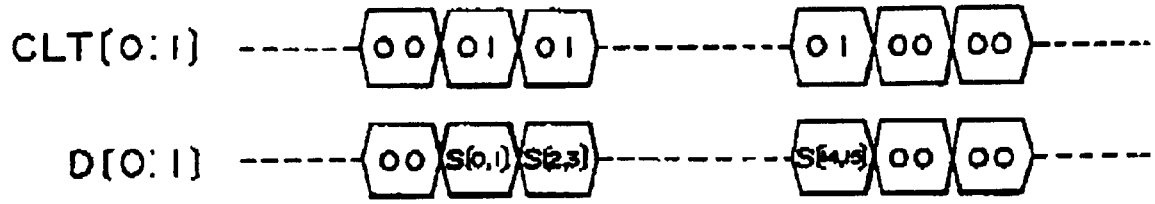
FIGS. 14A, 14B, and 14C are illustrative of the control bus CTL, data bus D, and status information (status bits)

Whether or not the system is in the self-ID period is detected as described below. First of all, the bus monitor circuit 130 monitors the 2-bit CTL bus from the PHY chip. If the signal on the CTL is (01), as shown in FIG. 14A, the bus monitor circuit 130 determines that status information is being sent from the PHY chip over the data bus D, as shown in FIG. 14B. By checking the contents of status bits within the status information that is being sent from the PHY chip over the data bus D, the bus monitor circuit 130 can determine whether or not a bus reset has occurred (bit 2) and whether or not a subaction gap has arrived (bit 1), as shown in FIG. 14C. If the bus monitor circuit 130 judges that a bus reset has occurred, it makes BRIP go high, as shown in FIG. 13; if it judges that a subaction gap has arrived, it returns BRIP to low.

This ensures that the packet diagnosis circuit 142 can detect whether or not this is the self-ID period by monitoring the level of BRIP. Any packet that is sent in during this self-ID period is taken to be a self-ID packet, and automatic IRM detection can be performed by diagnosing these self-ID packets.

The bus monitor circuit 130 uses the CTL and D buses to acquire the ID of the self-node. In other words, if the PHY chip defines a self-ID during the self-ID period, a self-ID packet comprising that ID is broadcast and also that ID is stored in a register within the PHY chip. The contents of this register in the PHY chip can be determined by viewing status bits 8 to 15 of the status information shown in FIG. 14C. Therefore, if a self-ID becomes definite, the bus monitor circuit 130 can acquire this ID by checking CTL and D. The acquired ID is output to the PHY ID register 144 as status data (SD). Note that SS denotes a strobe signal for determining the timing of SD fetch.

In the example shown in FIG. 13, the first node to transfer a self-ID packet is the self-node. Therefore, the SD that indicates the acquired self-ID is output as the timing of A2 and the PHY ID register 144 uses SS to fetch this SD. This ensures that the PHY ID register 144 can hold the PHY_ID that is the ID of the self-node, as shown at A3.

If the signal on the CTL is (10), as shown in FIG. 14B, this is the receive state and a self-ID packet is being sent from the PHY chip over the data bus D. The serial-parallel conversion circuit 132 converts the data in this self-ID packet into 32-bit data DI and outputs it to the packet diagnosis circuit 142 and the IRM ID register 146.

Note that DIE is a signal indicating whether the DI data is enabled or disabled (enabled when DIE is high). The packet diagnosis circuit 142 can determine the boundaries of packets by checking this DIE signal. In addition, DIS is a strobe signal for determining the timing of DI fetch.

On receiving DI, the packet diagnosis circuit 142 diagnoses the self-ID packets of the node comprised within DI. In other words, it checks the C and L bits of each self-ID packet shown in FIG. 4A. If the C bit that indicates whether or not the node has IRM capability is 1 and the L bit that indicates whether or not the link layer is active is also 1, the node that sent that self-ID packet is identified as being qualified to become the IRM and a GID (GetID) signal goes high.

In the example shown in FIG. 13, the first node to transfer a self-ID packet (the self-node) is qualified to become the IRM, so GID goes high at the timing of A4. On receiving DI from the serial-parallel conversion circuit 132, the IRM ID register 146 uses the GID as a strobe signal to acquire the ID comprised within the first self-ID packet, and holds it.

The node that sent the third self-ID packet in FIG. 13 is qualified to become the IRM, so GID goes high at the timing of A6. The IRM ID register 146 uses this GID as a strobe signal to acquire the ID comprised within the third self-ID packet, and rites it over the previous contents. Since the total number of nodes in FIG. 13 is three, the node that sent the third self-ID packet is defined as the IRM.

In other words, self-ID packets are send out in sequence starting from the nodes furthermost from the root (in sequence from the node with the smallest ID). The node that becomes the IRM is the closest node to the root, amongst all the nodes that are qualified to become the IRM (i.e., where both the C bit and the L bit are 1). Therefore, if the ID of each node that is qualified to become the IRM is overwritten into the IRM ID register 146, it is possible to retain the last node defined as the IRM in the IRM ID register 146.

In this manner, this embodiment of the invention succeeds in automatically detecting and retaining the ID of the node that will become the IRM, using the hardware.

This embodiment also determines whether or not the node that will become the IRM is the self-node and, if it is the self-node, it retains information indicating that fact.

In other words, the PHY ID register 144 outputs to the WIRM creation circuit 148 the PHY_ID indicating the ID of the self-node, and the IRM ID register 146 outputs to the WIRM creation circuit 148 the IRM_ID indicating the node that will become the IRM (more precisely: a node that has the possibility of becoming the IRM).

The WIRM creation circuit 148 compares these PHY_ID and IRM_ID. If they match, it makes WIRM (WonIRM) go high; if they do not match, it makes WIRM go low. This WIRM level is held in the WIRM register 150.

During this time, this embodiment of the invention uses both a GPID (GotPhyID) signal that goes active on condition that the ID of the self-node has become definite and a ESID (EndSelfID) that goes active on condition that the self-ID period has ended, to compare PHY_ID and IRM_ID.

In this case, the GPID signal is generated by the PHY ID register 144 using a signal such as SS. The ESID signal is generated by the packet diagnosis circuit 142 using a signal such as BRIP.

In the example shown in FIG. 13, PHY_ID and IRM_ID are compared at the timing at which GPID goes high, as indicated by A8. Since the result of this comparison shows that they match, WIRM goes high. PHY_ID and IRM_ID are compared again at the timing at which ESID goes high, as indicated by A9. Since the result of this comparison shows that they do not match, WIRM goes back to low.

In other words, the node that will become the IRM is not defined until the self-ID packets of all the nodes have been checked. It is therefore necessary to check whether or not PHY_ID and IRM_ID match, not only at the timing at which GPID goes active but also at the timing at which ESID goes active (the timing at which the self-ID period ends).

Figure 15:
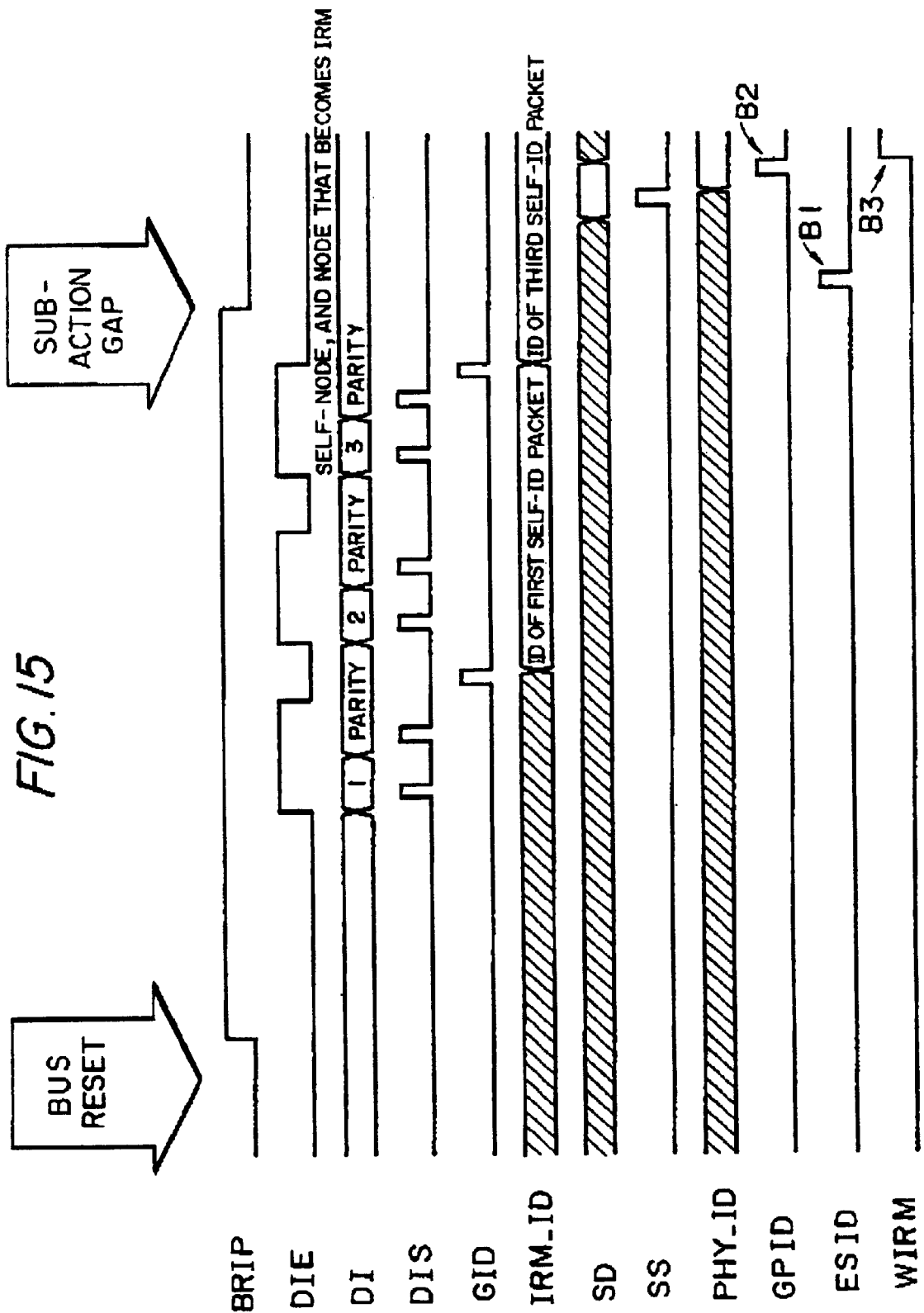
FIG. 15 is another timing waveform chart illustrating the detailed processing example of IRM detection.

In another example shown in FIG. 15, the node that sends the third self-ID packet is the self-node and that self-node becomes the IRM. In this case, it is possible that the ID of the self-node will not become definite at the timing at which ESID goes active, in other words, at the timing at which the self-ID period ends, as indicated by B1. Therefore, if PHY_ID and IRM_ID are compared at that time, it will be judged that they do not match and WIRM will remain low.

On the other hand, if PHY_ID and IRM_ID are compared again at the timing at which the GPID goes active, as indicated by B2, in other words, after the self-node has become definite, they will match. Thus WIRM goes high at B3. This makes it possible to ensure accurate detection of the fact that the self-node that sends the self-ID packet third has become the IRM.

Note that it is possible that there will be some PHY chips (physical-layer devices) wherein the timing at which GPID becomes active, in other words, the timing at which the ID of the self-node becomes definite, is earlier than the end of the self-ID period. If such a PHY chip is combined with the data transfer control device of this embodiment, a judgement can be made as to whether or not the self-node has become the IRM at the end of the self-ID period, in other words, at the detection of a subaction gap.

This embodiment of the invention makes it possible to automatically detect the ID of the node that will become the IRM and retain that ID in the IRM ID register 146, and also makes it possible to hold information that the self-node has become the IRM (WIRM) in the WIRM register 150. This is successful in dramatically reducing the processing load on firmware running on the CPU 66.

In other words, when isochronous transfer is performed, it is necessary to acquire the channel number and bandwidth from the IRM. Is it therefore necessary for the firmware (transaction layer) to know the ID of the IRM.

However, since the IRM could not be detected automatically by hardware means in the past, the firmware has had to create a topology map based on self-ID packets and then detect the ID of the IRM from that topology map.

Figure 16A:
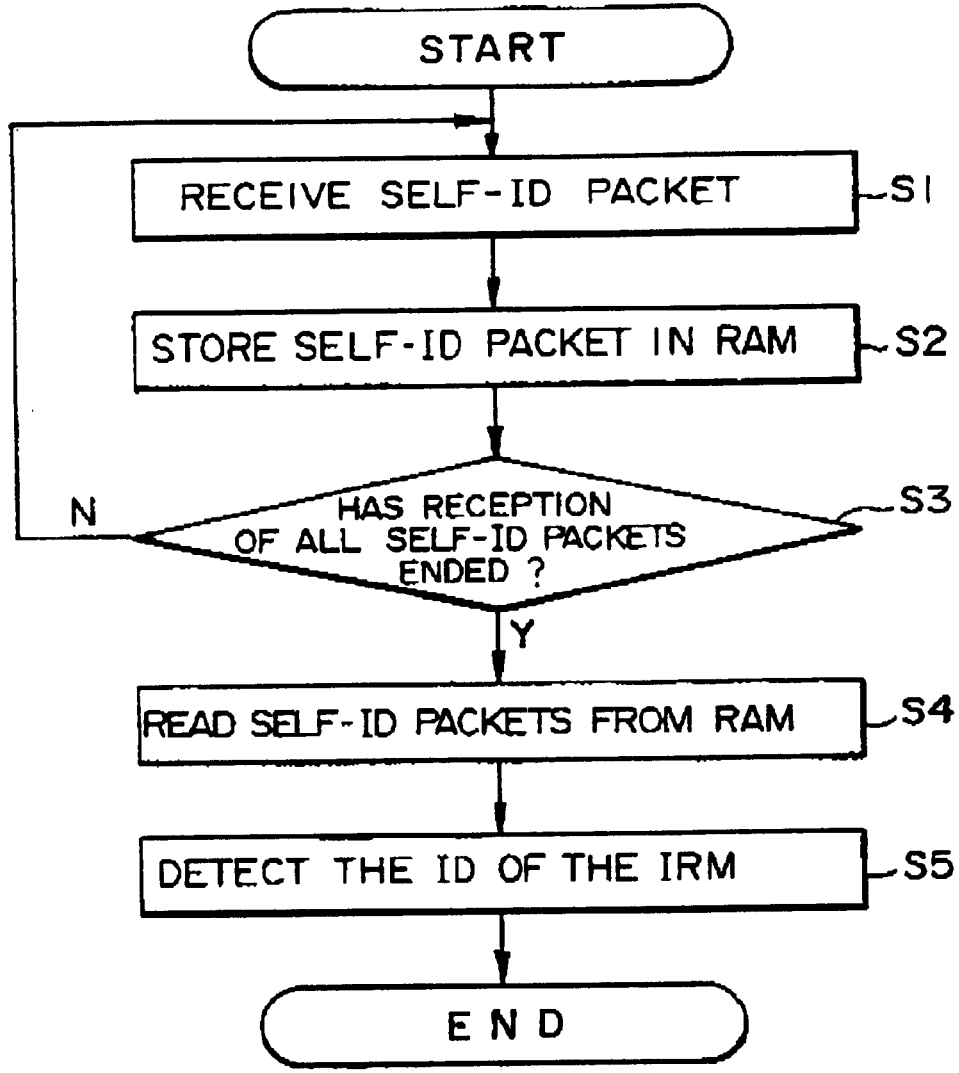
FIGS. 16A and 16B are illustrative of a comparison between the firmware processing performed by a comparative example and this embodiment of the invention.

Taking the data transfer control device configured as shown in FIG. 8 as an example, the firmware that is run by the CPU 912 would have to do the processing shown in FIG. 16A. In other words, when the firmware receives a self-ID packet, that packet is stored in the RAM 914 that is provided locally for the CPU 912 (steps S1 and S2). When the firmware has finished receiving all of the self-ID packets (step S3), the received self-ID packets are read from the RAM 914 (step S4). After various processes such as creating a topology map are performed, the ID of the IRM is detected by the software (step S5). This process of detecting the ID of the IRM places an extremely large load on the firmware.

Figure 16B:
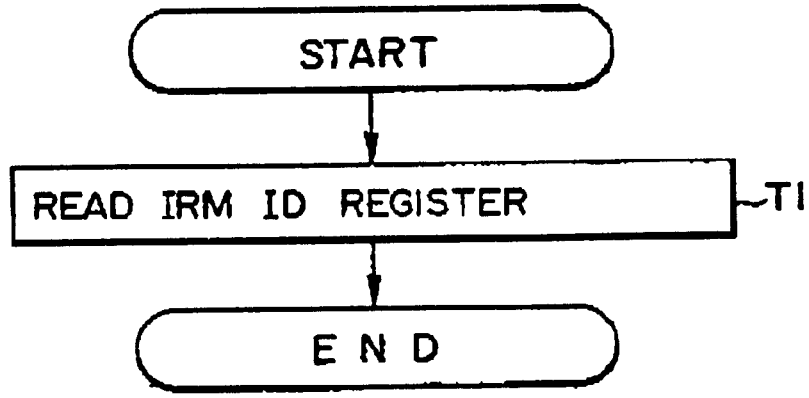

In contrast thereto, this embodiment of the invention ensures that the firmware only has to read the IRM ID register 146 of FIG. 12 in order to discern the ID of the IRM, as shown by step T1 in FIG. 16B. The processing load on the firmware is therefore extremely light, making it possible to expect an improvement in the actual transfer speed of the entire system.

In addition, FIG. 16A shows that it is necessary to store all of the received self-ID packets in RAM. The same number of self-ID packets as nodes is required, so that if 63 nodes are connected to the bus, by way of example, a minimum of 63 self-ID packets must be held. If the self-ID packet are stored in their original form in RAM, therefore, the free space within the RAM is reduced.

In contrast thereto, this embodiment of the invention makes it possible to detect the IRM automatically, without storing the self-ID packets in RAM. This makes is possible to economize on the usage capacity of the RAM.

Note that this embodiment could also be configured in such a manner that self-ID packets are stored in RAM, for use for other purposes. In such a case, it is preferable that a packet is created, consisting of a frame made up of a header (broadly speaking, control information) followed by a string of a plurality of self-ID packets, and this packet is stored in RAM. It is also preferable in this case that the data is configured by erasing the portions of error detection information in the second quadlet of the self-ID packets of FIGS. 4A and 4B (which is an inversion of the first 32 bits). This makes it possible to further reduce the size of the created powder.

4. Electronic Equipment

The description now turns to examples of electronic equipment comprising the data transfer control device of this embodiment.

Figure 17A:
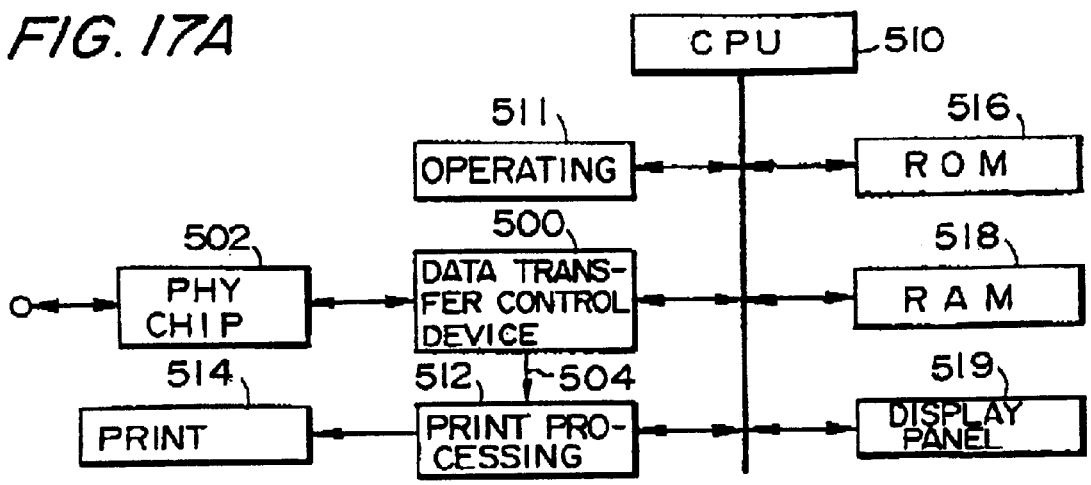
FIGS. 17A, 17B, and 17C show examples of the internal block diagrams of various items of electronic equipment.
Figure 18A:
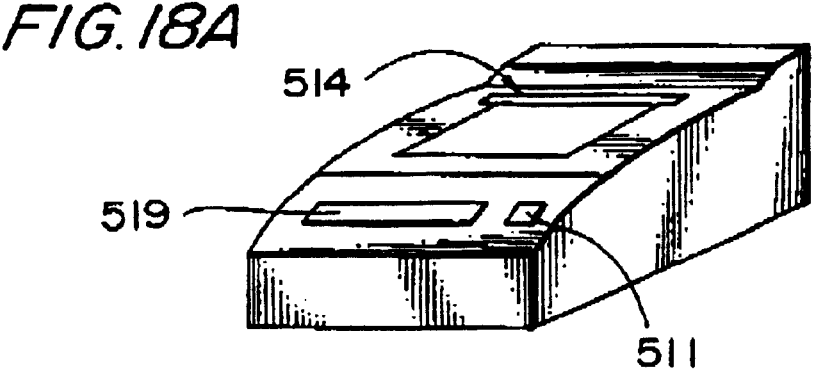
FIGS. 18A, 18B, and 18C show external views of various items of electronic equipment.

An internal block diagram of a printer that is one example of such electronic equipment is shown in FIG. 17A with an external view thereof being shown in FIG. 18A. A CPU (microcomputer) 510 has various functions, including controlling the entire system. An operating panel 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, via a PHY chip 502 and a data transfer control device 500 is sent directly to a print processing section 512 over a bus 504. The print data is subjected to given processing by the print processing section 512 and is output for printing to paper by a print section (a device for outputting data) 514 including a printhead.

Figure 17B:
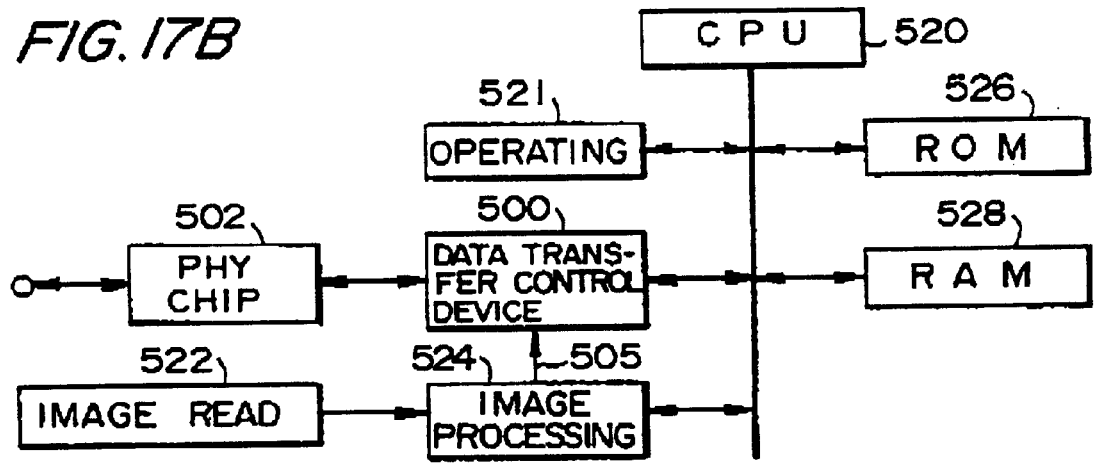
Figure 18B:
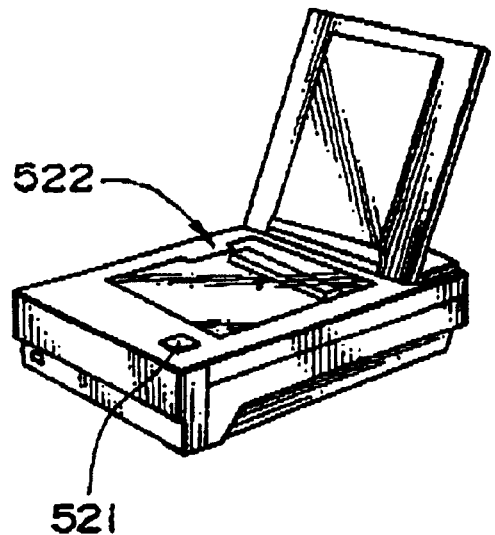

An internal block diagram of a scanner that is another example of electronic equipment is shown in FIG. 17B with an external view thereof being shown in FIG. 18B. A CPU 520 has various functions, including controlling the entire system. An operating panel 521 is designed to allow the user to operate the scanner. Data such as a control program is stored in a ROM 526 and a RAM 528 functions as a work area for the CPU 520.

An image of a document is read in by an image read section (a device for taking in data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets via the PHY chip 502 to another node such as a personal computer.

Figure 17C:
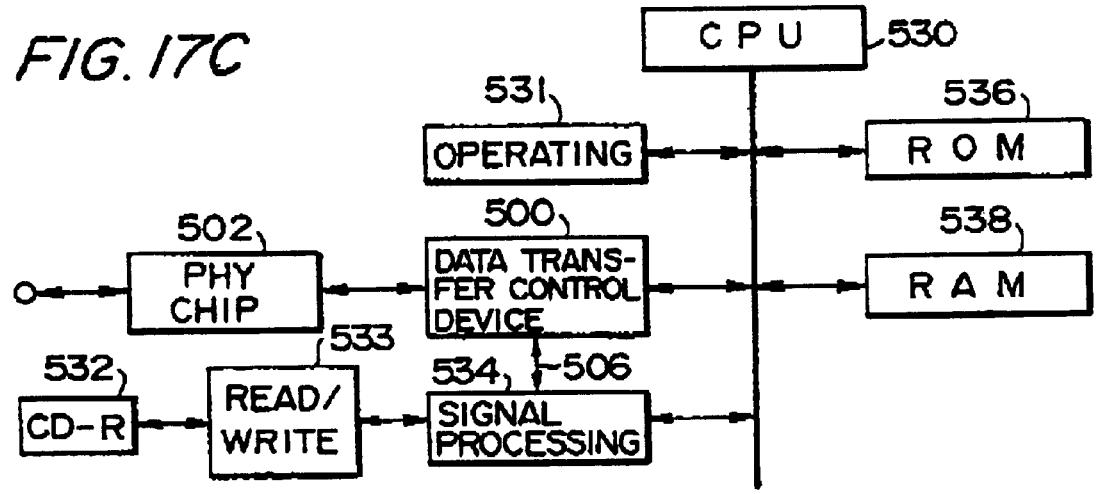
Figure 18C:
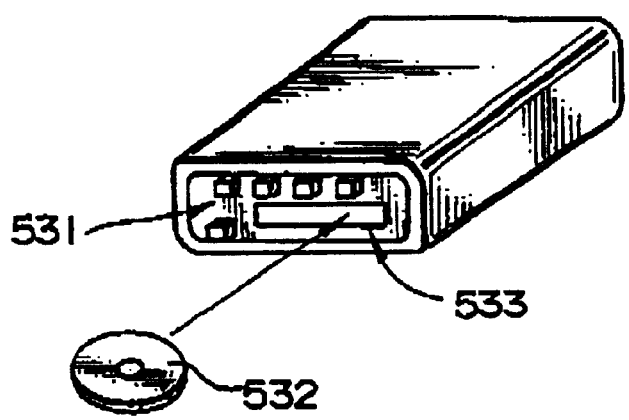

An internal block diagram of a CD-R drive that is a further example of electronic equipment is shown in FIG. 17C with an external view thereof being shown in FIG. 18C. A CPU 530 has various functions, including controlling the entire system. An operating panel 531 is designed to allow the user to operate the CD-R. Data such as a control program is stored in a ROM 536 and a RAM 538 functions as a work area for the CPU 530.

Data read out from a CD-R 532 by a read/write section (a device for taking in data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets via the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by a read/write section 533 in the CD-R 532.

Note that another CPU for data transfer control by the data transfer control device 500 could be provided in addition to the CPU 510, 520, or 530 of FIG. 17A, 17B, or 17C.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image after only a small lapse of time after instructing the scanner to take an image. It is also possible to read data from a CD-R or write data to a CD-R at high speeds. This invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU. It is therefore possible to use an inexpensive CPU and low-speed buses, which enables reductions in the cost and size of the electronic equipment.

Note that the electronic equipment that can employ a data transfer control device in accordance with this invention is not limited to the above described embodiments, so that various other examples can be considered, such as various types of optical disk drive (CD-ROM or DVD), magneto-optical (MO) disk drives, hard disk drives, TVs, VTRs, video cameras, audio equipment, telephones, projectors, personal computers, electronic notebooks, and dedicated wordprocessors.

Note also that this invention is not limited to the embodiments described herein, and various modifications are possible within the scope of the invention laid out herein.

For example, the configuration of the data transfer control device in accordance with this invention is preferably that as shown in FIG. 6, but it is not limited thereto. It is also possible to employ the configuration shown in FIG. 8, by way of example.

In addition, the manager having a given management function in accordance with this invention is preferably an isochronous resource manager conforming to the IEEE 1394 standard, but it is not limited thereto.

Similarly, this invention is preferably applied to data transfer as defined by the IEEE 1394, but it is not limited thereto. For example, this invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, the data transfer control device comprising:

a circuit for diagnosing a self identification packet and for automatically detecting a node that is qualified to become a manager having a given management function based on the results of the diagnosis, when the self identification packet containing basic information on each node is transferred from each node; and first holding means for acquiring an identification number of a detected node from basic information in the self identification packet sent by that node, and for holding that identification number for a controller that controls data transfer.

2. The data transfer control device as defined in claim 1, wherein an identification number of a node is overwritten onto an identification number previously held in the first holding means, when it is determined from basic information in the self identification packet sent by the node that the node is qualified to become the manager having the management function, on condition that self identification packets are sent in sequence starting from nodes furthermost from a root node within node connection topology.

3. The data transfer control device as defined in claim 1, further comprising a circuit for detecting whether or not the system is within a self identification period, based on status information sent in from a lower layer;

wherein a packet that arrives within the self identification period is assumed to be a self identification packet, and a node that is qualified to become the manager is automatically detected based on that self identification packet.

4. The data transfer control device as defined in claim 2, further comprising a circuit for detecting whether or not the system is within a self identification period, based on status information sent in from a lower layer;

wherein a packet that arrives within the self identification period is assumed to be a self identification packet, and a node that is qualified to become the manager is automatically detected based on that self identification packet.

5. The data transfer control device as defined in claim 1, further comprising second holding means for holding information indicating that a self node is the manager having the management function, when the identification number of a node that is qualified to become the manager matches the identification number of the self node; and a signal creation circuit for detecting whether an identification number of a manager node matches an identification number of the self node.

6. The data transfer control device as defined in claim 2, further comprising second holding means for holding information indicating that a self node is the manager having the management function, when the identification number of a node that is qualified to become the manager matches the identification number of the self node; and a signal creation circuit for detecting whether an identification number of a manager node matches an identification number of the self node.

7. The data transfer control device as defined in claim 5, wherein a judgement is made as to whether or not the identification number of the node that is qualified to become the manager matches the identification number of the self node, using both a first signal that becomes active on condition that the identification number of the self node has become definite and a second signal that becomes active on condition that a self identification period has ended.

8. The data transfer control device as defined in claim 6, wherein a judgement is made as to whether or not the identification number of the node that is qualified to become the manager matches the identification number of the self node, using both a first signal that becomes active on condition that the identification number of the self node has become definite and a second signal that becomes active on condition that a self identification period has ended.

9. The data transfer control device as defined in claim 5, wherein a judgement is made as to whether or not the identification number of the node that is qualified to become the manager matches the identification number of the self node, using a third signal that becomes active on condition of the detection of a subaction gap.

10. The data transfer control device as defined in claim 6, wherein a judgement is made as to whether or not the identification number of the node that is qualified to become the manager matches the identification number of the self node, using a third signal that becomes active on condition of the detection of a subaction gap.

11. The data transfer control device as defined in claim 1, further comprising means for reading out from the first holding means the identification number of a node that is qualified to become the manager and for controlling data transfer by use of the read-out identification number.

12. The data transfer control device as defined in claim 2, further comprising means for reading out from the first holding means the identification number of a node that is qualified to become the manager and for controlling data transfer by use of the read-out identification number.

13. The data transfer control device as defined in claim 5, further comprising means for reading out from the first holding means the identification number of a node that is qualified to become the manager and for controlling data transfer by use of the read-out identification number.

14. The data transfer control device as defined in claim 1, wherein the manager having the management function is an isochronous resource manager in accordance with IEEE 1394.

15. The data transfer control device as defined in claim 2, wherein the manager having the management function is an isochronous resource manager in accordance with IEEE 1394.

16. The data transfer control device as defined in claim 5, wherein the manager having the management function is an isochronous resource manager in accordance with IEEE 1394.

17. Electronic equipment comprising:

the data transfer control device as defined in claim 1;

a device for performing given processing on data that has been received from another node via the data transfer control device and the bus; and a device for outputting or storing data that has been subjected to said processing.

18. Electronic equipment comprising:

the data transfer control device as defined in claim 2;

a device for performing given processing on data that has been received from another node via the data transfer control device and the bus; and a device for outputting or storing data that has been subjected to said processing.

19. Electronic equipment comprising:

the data transfer control device as defined in claim 5;

a device for performing given processing on data that has been received from another node via the data transfer control device and the bus; and a device for outputting or storing data that has been subjected to said processing.

20. Electronic equipment comprising:

the data transfer control device as defined in claim 1;

a device for performing given processing on data that is to be sent to another node via the data transfer control device and the bus; and a device for taking in data to be subjected to said processing.

21. Electronic equipment comprising:

the data transfer control device as defined in claim 2;

a device for performing given processing on data that is to be sent to another node via the data transfer control device and the bus; and a device for taking in data to be subjected to said processing.

22. Electronic equipment comprising:

the data transfer control device as defined in claim 5;

a device for performing given processing on data that is to be sent to another node via the data transfer control device and the bus; and a device for taking in data to be subjected to said processing.

23. A data transfer control device for transferring data among a plurality of nodes that are connected to a bus, the data transfer control device comprising:

a diagnostic circuit which diagnoses a self identification packet and automatically detects a node that is qualified to become a manger having a given management function based on the results of the diagnosis, when the self identification packet containing basic information on each node is transferred from each node; and a first holding circuit which is electronically connected to the diagnosis circuit, acquires an identification number of a detected node from basic information in the self identification packet sent by that node, and hold that identification number for a controller that controls data transfer.

24. The data transfer control device as defined in claim 23, wherein an identification number of a node is overwritten onto an identification number previously held in the first holding circuit, when it is determined from basic information in the self identification packet sent by the node that the node is qualified to become the manager having the management function, on condition that self identification packets are sent in sequence starting from nodes furthermost from a root node within node connection topoloyg.

25. The data transfer control device as defined in claim 23, further comprising a monitor circuit which is electronically connected to the diagnosis circuit and detects whether or not the system is within a self identification period, based on status information sent in from a lower layer, wherein a packet that arrives within the self identification period is assumed to be a self identification packet, and the node that is qualified to become the manager is automatically detected based on that self identification packet.

26. The data transfer control device as defined in claim 23, further comprising a second holding circuit which holds information indicating that a self node is the manager having the management function, when the identification number of the node that is qualified to become the manager matches the identification number of the self node; and a signal creation circuit which is connected to the second holding circuit and detects whether or not an identification number of a manager node matches an identification number of the self node.

27. The data transfer control device as defined in claim 26, wherein a judgment is made as to whether or not the identification number of the node that is qualified to become the manager matches the identification number of the self node, using both a first signal that becomes active on condition that the identification number of the self node has become definite and a second signal that becomes active on condition that a self identification period has ended.

28. The data transfer control device as defined in claim 26, wherein a judgment is made as to whether or not the identification number of the node that is qualified to become the manager matches the identification number of the self node, using a third signal that becomes active on condition of the detection of a subaction gap.

29. The data transfer control device as defined in claim 23, further comprising a control circuit which reads out from the first holding circuit the identification number of the node that is qualified to become the manager, and controls data transfer by use of the read out identification number.

30. A data transfer control method for transferring data among a plurality of nodes that are connected to a bus, comprising:

diagnosing a self identification packet and automatically detecting a node that is qualified to become a manager having a given management function based on the results of the diagnosis, when the self identification packet containing basic information on each node is transferred from each node; and acquiring an identification number of a detected node from basic information in the self identification packet sent by that node, and holding the identification number in a first holding circuit for a controller that controls data transfer.

31. The data transfer control method as defined in claim 30, comprising, overwriting an identification number of a node onto an identification number previously held in the first holding circuit, when it is determined from basic information in the self identification packet sent by the node that the node is qualified to become the manager having the management function, on condition that self identification packets are sent in sequencing starting from nodes furthermost from a root node within node connection topology.

32. The data transfer control method as defined in claim 30, comprising:

detecting whether or not the system is within a self identification period, based on status information sent in from a lower layer;

wherein a packet that arrives within the self identification period is assumed to be a self identification packet, and the node that is qualified to become the manager is automatically detected based on that self identification packet.

33. The data transfer control method as defined in claim 30, comprising:

holding in a second holding circuit information indicating that a self node is the manager having the management function, when the identification number of the node that is qualified to become the manager matches the identification number of the self node; and detecting whether or not an identification number of a manager node matches an identification number of the self node.

34. The data transfer control method as defined in claim 33, comprising, judging whether or not the identification number of the node that is qualified to become the manager matches the identification number of the self node, using both a first signal that becomes active on condition that the identification number of the self node has become definite and a second signal that becomes active on condition that a self identification period has ended.

35. The data transfer control method as defined in claim 33, comprising, judging whether or not the identification number of the node that is qualified to become the manager matches the identification number of the self node, using a third signal that becomes active on condition of the detection of a subaction gap.

36. The data transfer control method as defined in claim 30, comprising, reading out from the first holding circuit the identification number of the node that is qualified to become the manager and controlling data transfer by use of the read out identification number.

* * * * *